United States Patent [19]
Best et al.

[11] 3,775,909
[45] Dec. 4, 1973

[54] SUCCESSIVE LENS POLISHING APPARATUS

[75] Inventors: Howard S. Best, Horseheads, N.Y.; Anthony A. Spycher, Wellsboro, Pa.

[73] Assignee: Corning Glass Works, Corning, N.Y.

[22] Filed: Jan. 24, 1972

[21] Appl. No.: 220,315

[52] U.S. Cl. .................. 51/110, 51/134, 198/19
[51] Int. Cl. ...................... B24b 7/24, B23q 7/14
[58] Field of Search .................. 198/19; 51/215 R, 51/215 AR, 215 E, 215 M, 237 R, 237 T, 131, 134, 108, 110

[56] References Cited
UNITED STATES PATENTS

| | | | |
|---|---|---|---|
| 2,736,993 | 3/1956 | Tripp | 51/131 |
| 3,195,451 | 7/1965 | Hoverkamp et al. | 198/19 X |
| 3,399,498 | 9/1968 | Lampani et al. | 51/215 AR X |
| 3,354,782 | 11/1967 | Buchanan et al. | 198/19 X |

*Primary Examiner*—Harold D. Whitehead
*Assistant Examiner*—Nicholas P. Godici
*Attorney*—Clarence R. Patty, Jr. et al.

[57] ABSTRACT

Apparatus for handling and conveying a plurality or succession of articles, such as workpiece holders or carrier blocks, from a loading station where the articles, workpiece holders or carrier blocks are manually loaded onto an intermittently moved conveyor and thence are moved from the loading station to and through a plurality of work stations and finally moved to a manual unloading station. The workpiece holders or carrier blocks may, for example, be so-called optical lens blank spot blocks each of which holds or supports a plurality of optical lens blanks which are workpieces that are to be ground to a desired shape and then polished. Under these conditions the plurality of work stations include in succession a rough grinding station, a fine grinding station, and first, second and third polishing stations. The intermittently moved conveyor extends past all of the stations and through an endless looped path of travel. The conveyor comprises a succession of evenly spaced-apart workpiece holder conveyor plates for conveying the workpiece carrier blocks or holders to and from the work stations. A rotatable workpiece holder support means or turntable is provided at each work station and, since it requires approximately three times as long to polish lens blanks as it does to rough grind or to fine grind the blanks, the workpiece holder support means or turntables at the grinding stations are intermittently moved through rotational or arcuate paths of motion or travel three times as often as the similar turntables at the polishing stations. Each of the succession of carrier blocks or workpiece holders are manually loaded in a recess in every other successive one of the conveyor plates of the conveyor and each workpiece holder or carrier block is transferred by such conveyor to and from the support means or turntables at the grinding stations for grinding operations of lens supported on the carrier blocks or workpiece holders. Every first, second and third carrier block or workpiece holder is transferred to and from the support means or turntables at the first, second and third polishing stations, respectively. The conveyor is intermittently moved through its looped path of travel in time relationships with the intermittent movement of the turntables or support means at the plurality of work stations. Automatic control means are provided for the grinding and polishing operations.

13 Claims, 23 Drawing Figures

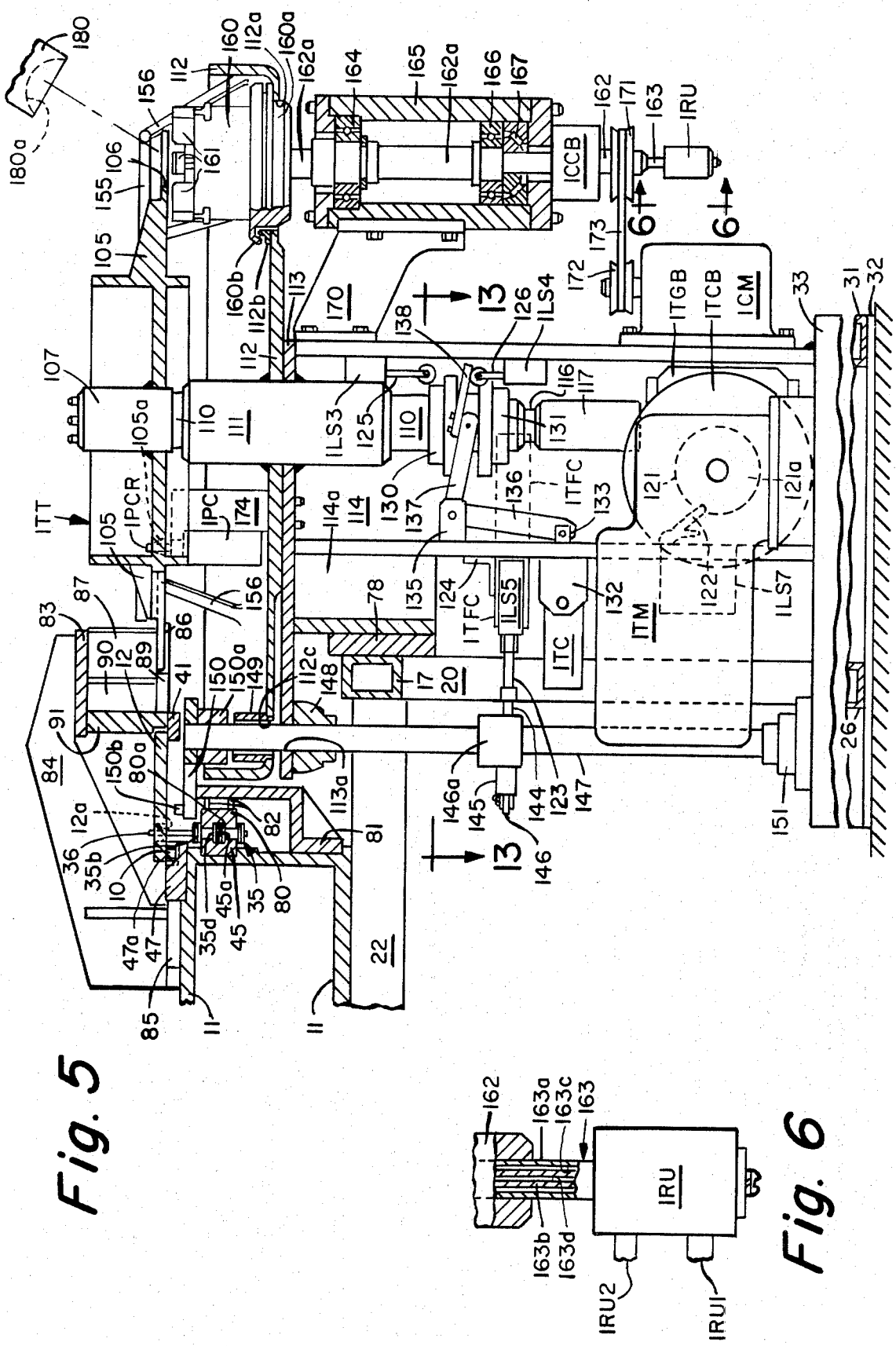

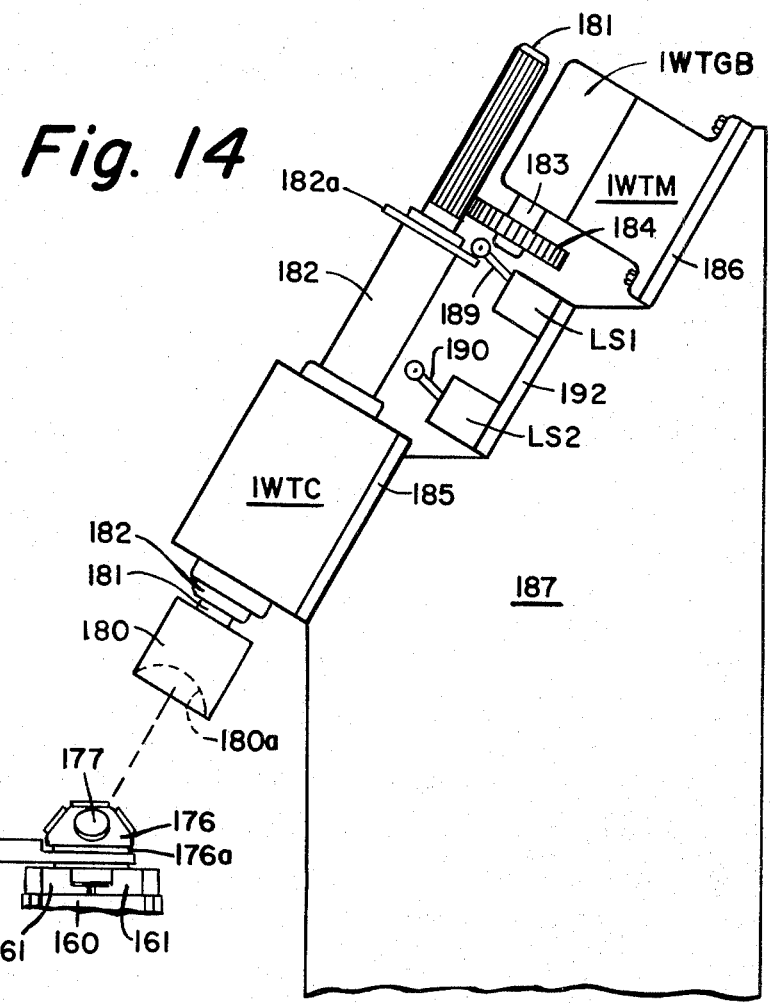
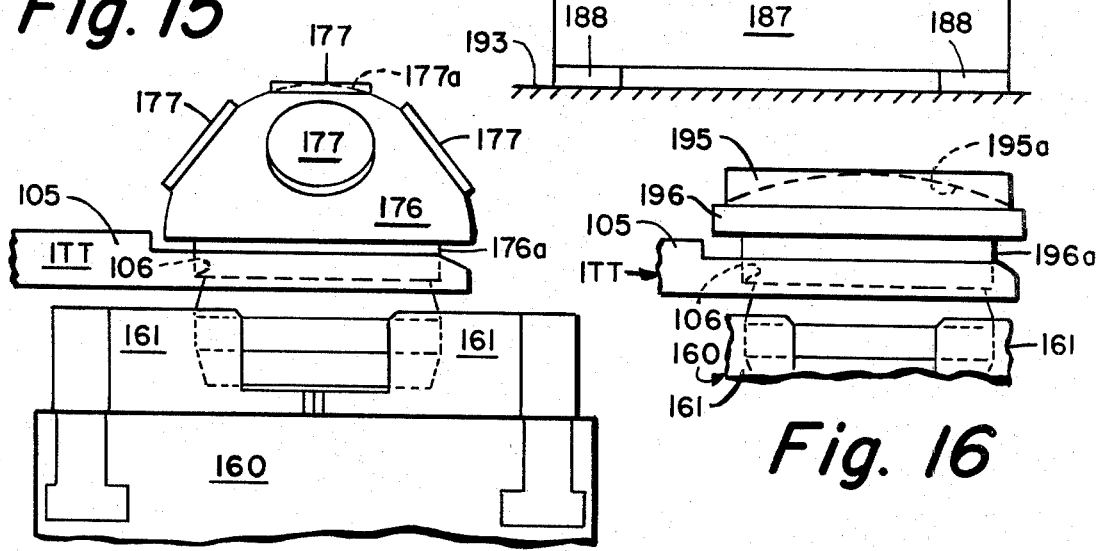

SUCCESSIVE LENS POLISHING APPARATUS

BACKGROUND OF THE INVENTION

In the grinding and polishing of optical lens blanks, such blanks are often secured to semispherical surfaces of workpiece holders or so-called carriers or spot blocks which are manually transferred between each of a series of work stations comprising a rough grinding station, a fine grinding station and a polishing station. Since, as previously mentioned, the polishing operation on the workpieces or blanks on a lens-blank carrier block or workpiece holder requires approximately triple the time of either of the two mentioned grinding operations, it is desirable to provide three polishing stations for each pair of rough grinding and fine grinding stations in order to assure that the grinding apparatus at each of the grinding stations may be continuously in use during the polishing operations. Said manual transfers of carrier blocks or workpiece holders between each of a series of work stations and the manual performance of grinding and polishing operations on the lens blanks or workpieces supported by each of the respective carrier blocks or workpiece holders are, as is well known to those skilled in the art, relatively time consuming and, therefore, relatively expensive. Accordingly, the apparatus of the present invention was developed to increase, to the extent possible, the speed of work operations performed on workpieces such as, for example, optical lens blanks supported on so-called workpiece holders or carrier blocks, along with a substantial increase in speed of transfer of the workpiece holders or carrier blocks between work stations for said work operations. As a specific example, two types of lens-blank carrier blocks which may be employed in the grinding and/or polishing of lens blanks are disclosed in U.S. Pat. No. 2,736,993, issued Mar. 6, 1956 to Walter C. Tripp for "Abrading Apparatus." The apparatus of the present invention is shown and described as handling articles such as lens-blank carrier blocks or workpiece holders similar but not entirely identical to lens-blank holder 52 shown in FIG. 5 of the drawings of said patent. However, the handling and conveying apparatus of the present invention can be used with lens-blank carrier blocks or workpiece holders similar but not necessarily identical to that shown in FIGS. 1 through 4 of said Tripp patent, or can be used for handling other types of articles. It is believed that this will be readily apparent to those skilled in the art and will become more apparent as the description proceeds.

In the light of the above it is one object of the present invention to increase the speed of article or workpiece handling and transfer operations by providing an apparatus for automatically conveying each of a plurality or series of articles, such as workpiece holders or lens-blank carrier blocks, through a path of travel from a manual conveyor-loading station to selected ones of a plurality of work stations and finally to a manual conveyor-unloading station. At such work stations, the articles, workpiece holders or carrier blocks are transferred to supports rotatable through circular paths of travel to intermittently carry or transfer the respective articles and their respectively supported workpieces to and from work locations provided in said circular paths of travel and where the respective work operations are performed on the workpieces by suitable tools provided at each such work location.

It is another object of the present invention to provide a control system for automatically actuating said tools to perform their respective operations at each said work location. Said articles are, as previously mentioned, finally conveyed by said conveyor to a manual conveyor-unloading station.

Other objects and characteristics features of the invention will become apparent as the description proceeds.

SUMMARY OF THE INVENTION

A brief summary of the invention disclosed herein is believed to be adequately set forth in the foregoing abstract and background of the invention.

BRIEF DESCRIPTION OF THE DRAWINGS

In the drawings:

FIG. 5 is an elevational view of the apparatus of FIG. 4, such view being taken generally along line 5—5 of FIG. 4;

FIG. 6 is an enlarged detail view, partially in cross-section, of a rotary union employed in the invention, such view being taken generally along line 6—6 of FIG. 5;

FIG. 14 is an elevational view of one type of work tool and its associated apparatus, and in conjunction with which the apparatus of the present invention is employed;

FIG. 15 comprises an enlarged detail view of one type of workpiece holder which may be carried adjacent the end of one of the radial arms of the turntable of FIGS. 4 and 5, and in conjunction with a plurality of which holders the apparatus of the present invention may be conveniently employed;

FIG. 16 is a view similar to FIG. 15 but illustrating another type of workpiece holder in conjunction with a plurality of which the apparatus of the present invention may be employed;

Similar reference characters refer to similar parts in each of the FIGS. of the drawings.

PREFERRED EMBODIMENTS OF THE INVENTION

Figure 1A:
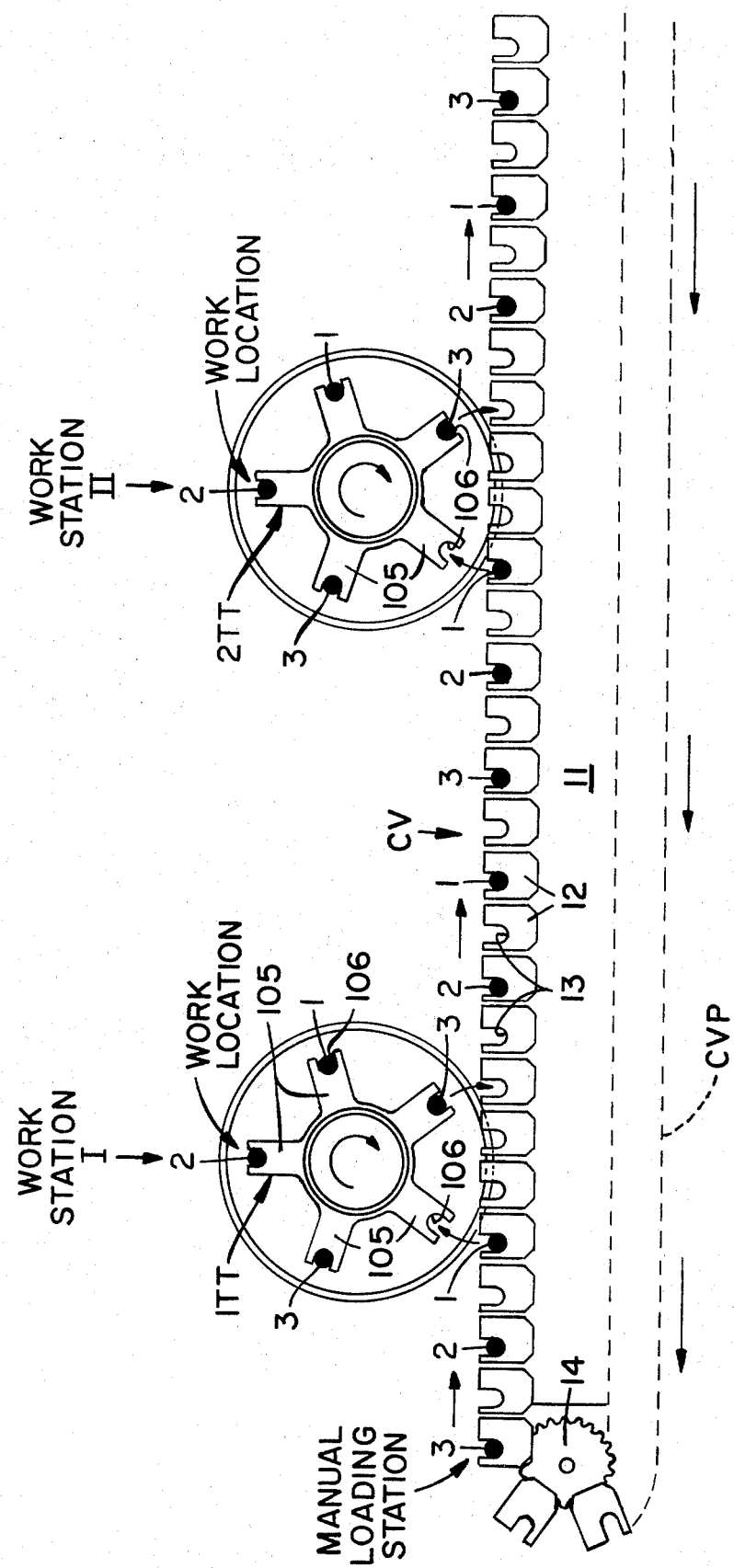
FIGS. 1a, 1b and 1c, when arranged in that order from left to right, comprise a schematic top plan view of the general layout of the apparatus embodying the invention.
Figure 1B:
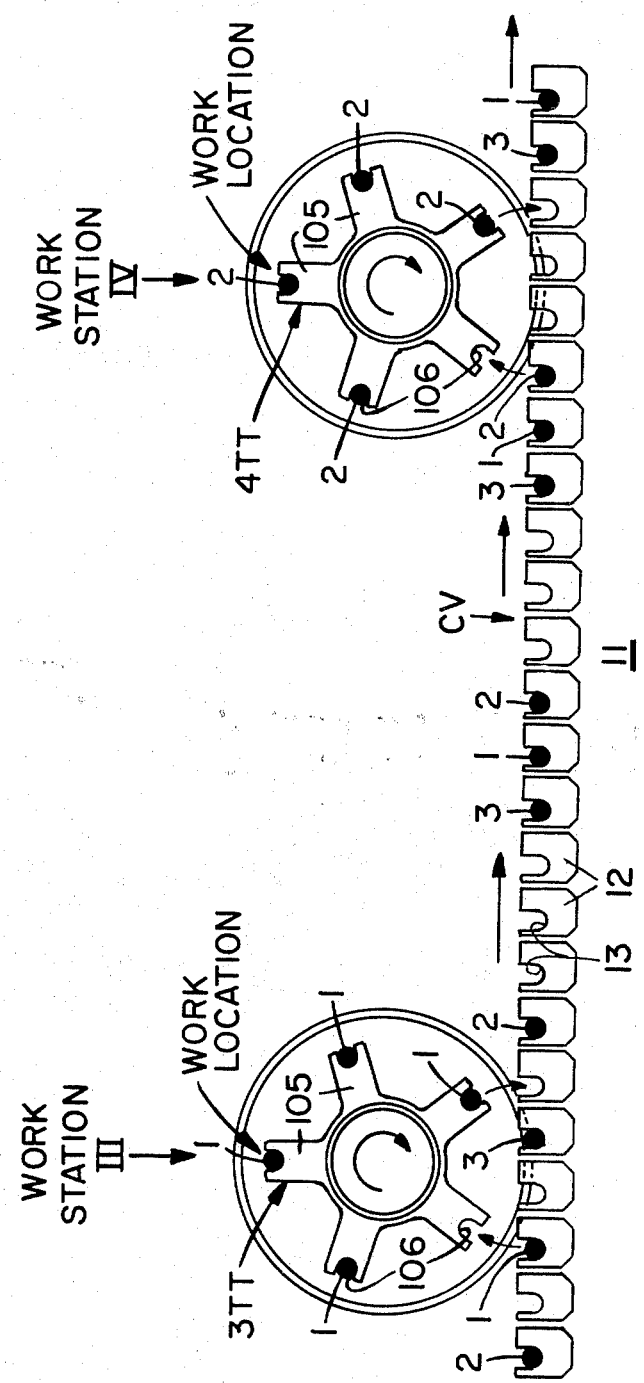
Figure 1C:
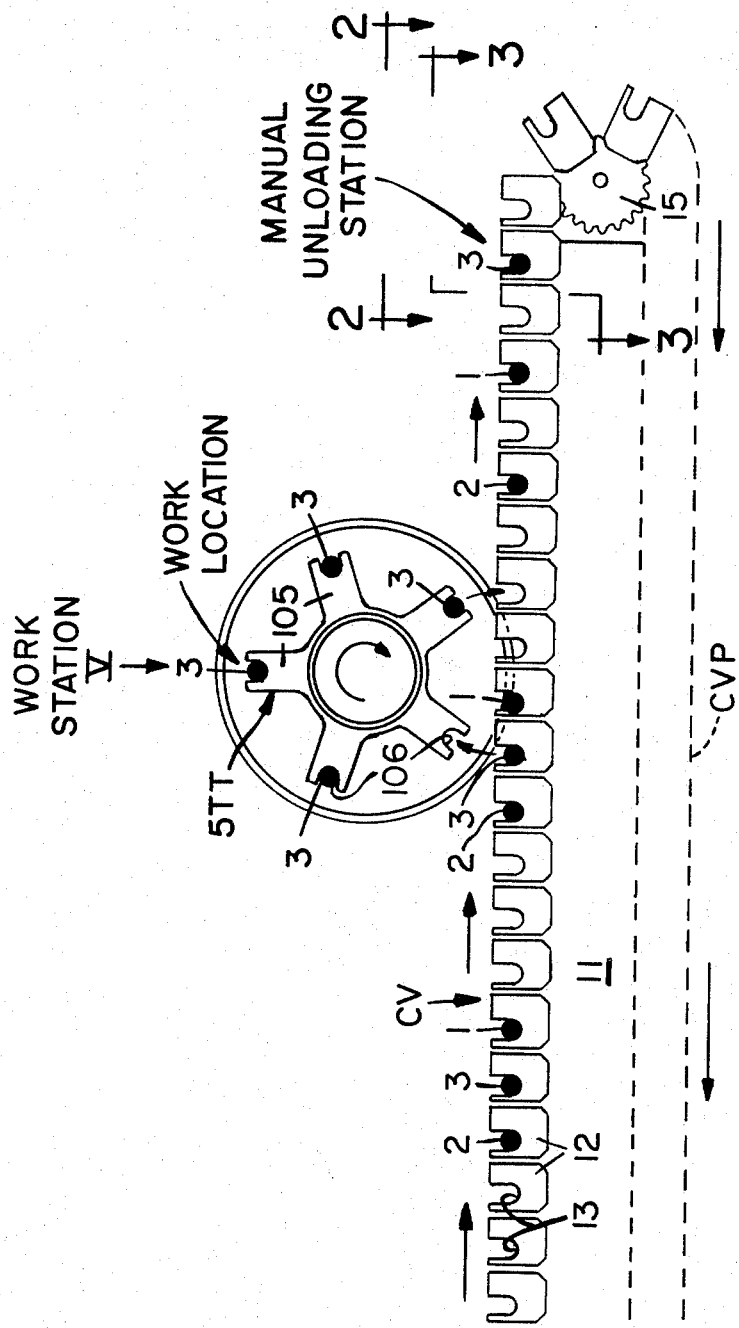

Referring first to FIGS. 1a, 1b and 1c there is shown a conveyor CV which extends through a looped path of travel designated CVP and is intermittently moved through such path past a manual loading station, a plurality or succession of work stations designated I through V and then past a manual unloading station. A turntable or workpiece holder support means is provided at each of said work stations and such turntables or support means at stations I through V are designated 1TT through 5TT, respectively. The turntables preferably, but need not necessarily, each have a stellate planar configuration including five radial arms, such as 105, each of which embodies adjacent the outer end thereof a recess such as 106. Each said turntable or workpiece holder support means is, as hereinafter further discussed in more detail, intermittently moved, stepped, or rotated clockwise through 72° of a 360° circular path of travel or movement so that the recesses such as 106 in the arms such as 105 are intermittently and sequentially moved to or arrive at a work location indicated at each work station. Conveyor CV includes an endless succession or loop of equally spaced apart conveyor plates such as 12 each of which embodies adjacent the outer edge thereof a recess such as 13. The conveyor and its succession of plates such as 12 are intermittently moved in the direction indicated by the arrows in FIGS. 1a, 1b and 1c, and the movement of the conveyor and its plates is accomplished by an endless double drive chain which loops about a double idler sprocket 14 and a double chain drive sprocket 15 which (viewing FIGS. 1a-1c) are provided at the left and right hand ends, respectively, of the aforesaid looped path of travel CVP of the conveyor. The double drive chain is designated by the reference character 35 but is not shown in FIGS. 1a, 1b, and 1c of the drawings for purposes of simplification thereof. Such chain 35 is, however, shown in several of the other drawing figures discussed below. The purpose of the general apparatus arrangement or layout will be discussed in more detail hereinafter in operational examples of the invention.

Figure 2:
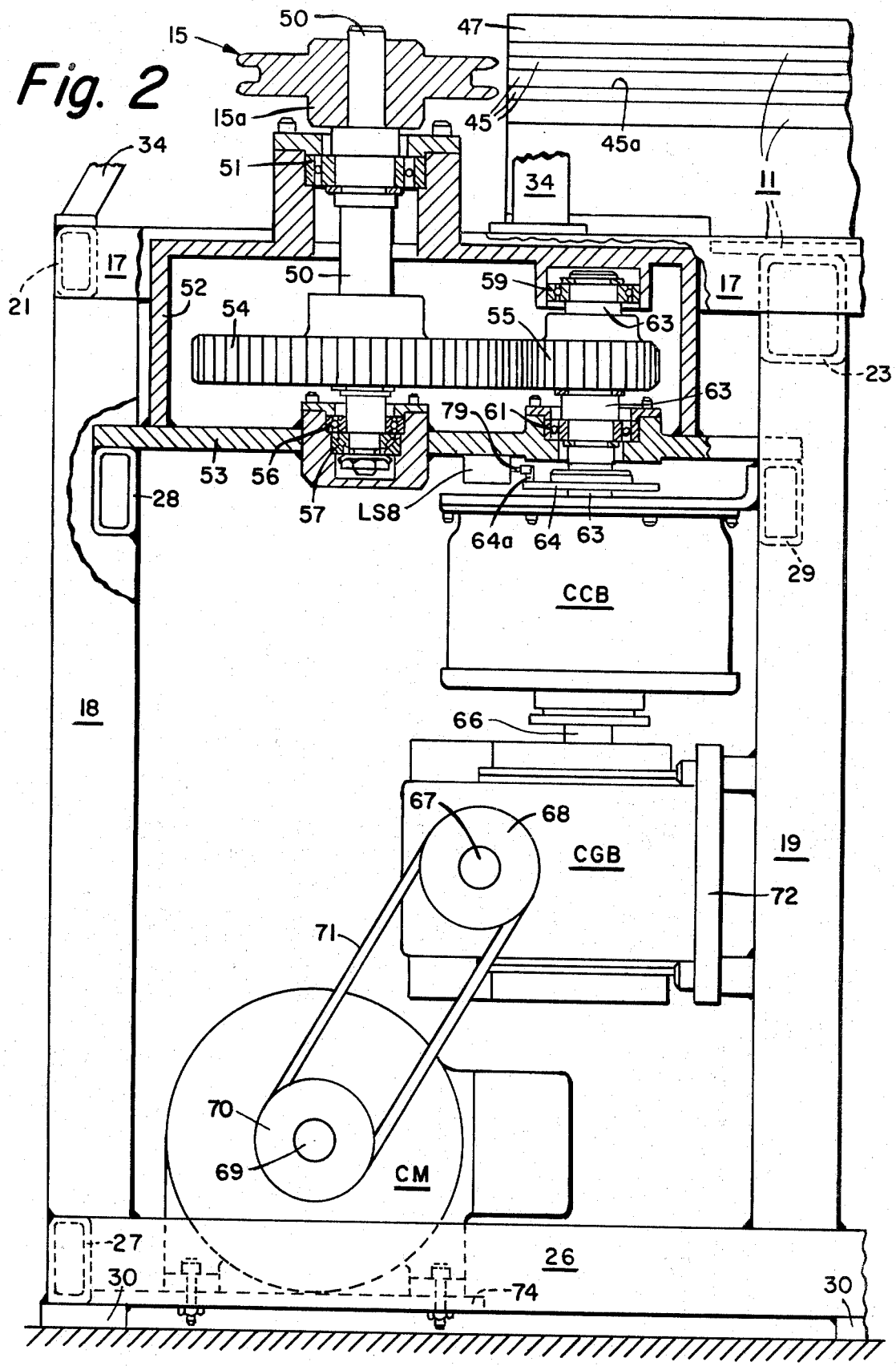
FIG. 2 is an elevational view, partially in cross-section, illustrating the apparatus for driving the conveyor plates of the invention, such view being taken in the general direction of line 2—2 in FIG. 1c.

Referring now to FIGS. 2 through 5 of the drawings taken in conjunction with FIGS. 1a, 1b and 1c, a main support beam 11 extends substantially the full length of conveyor CV with its left and right hand ends disposed adjacent sprockets 14 and 15, respectively. Such support beam is preferably a hollow beam (as best illustrated in FIG. 5) and the lower wall of the beam is, as illustrated in FIG. 2, cut away adjacent chain drive sprocket 15 to permit the remainder of the beam to be disposed in adjacency to such sprocket. A support frame for conveyor CV, beam 11 and the remainder of the apparatus associated therewith is provided along the entire length of the conveyor and comprises a beam 17 on the front of the conveyor (upper side of the conveyor when viewing FIGS. 1a, 1b, 1c, and 4) which extends the entire length of the conveyor. A similar beam extends the entire length of the conveyor on the back or rear side thereof but such beam is not shown in the drawings for purposes of simplification thereof.

Beam 17 is secured to the top of a series of upright supports or legs, such as 18 and 19, (FIG. 2) and 20 (FIG. 5) such supports being spaced along the length of beam 17 at suitable intervals. The bottom ends of the support legs, such as 18 and 19, (FIG. 2) are secured to the top of a beam 26 which rests on and is secured to feet such as 30 and extends for the entire length of the conveyor. At each of the work stations the legs, such as 20, rest on and are secured to the top of a suitable support platform such as 33 (FIG. 5) whose bottom rests on and is affixed to support beam 26 and to another support beam such as 31, both such beams resting on and being affixed to a foot such as 32. A beam similar to beam 26 extends along the length of the conveyor at the back thereof and the supports or legs at the back of the conveyor rest on and are secured to the top of such beam. This will be readily apparent to those skilled in the art and such arrangement is not shown in the drawings for purposes of simplification thereof. A series of cross beams such as 21 (FIG. 2) and 22 (FIG. 5) extend across the width of the conveyor between the upper beams such as 17 which extend for the length of the conveyor, and the ends of such cross beams 21 are attached to such upper beams. A series of spacer or lower beams such as 27 (FIG. 2) are provided at intervals along the length of the conveyor, such cross beams extending between the lower beams, such as 26, which also extend for the length of the conveyor as previously mentioned. The ends of the spacer or lower cross beams are affixed to the respective beams such as 26. As illustrated in FIG. 2, a relatively large diameter support beam 23 extends across the width of the conveyor between the top end of leg or upright support 19 and beam 17, and a similar upright or support provided at the back side of the conveyor. The ends of beam 23 are attached to the respective beams and legs such as 17 and 19, and beam 23 provides a secure support for main beam 11 adjacent the left hand end of such beam (viewing FIG. 2). It is pointed out that a similar support arrangement is provided for beam 11 adjacent the right hand end of the beam but such arrangement is not shown in the drawings for purposes of simplification thereof.

Figure 3:
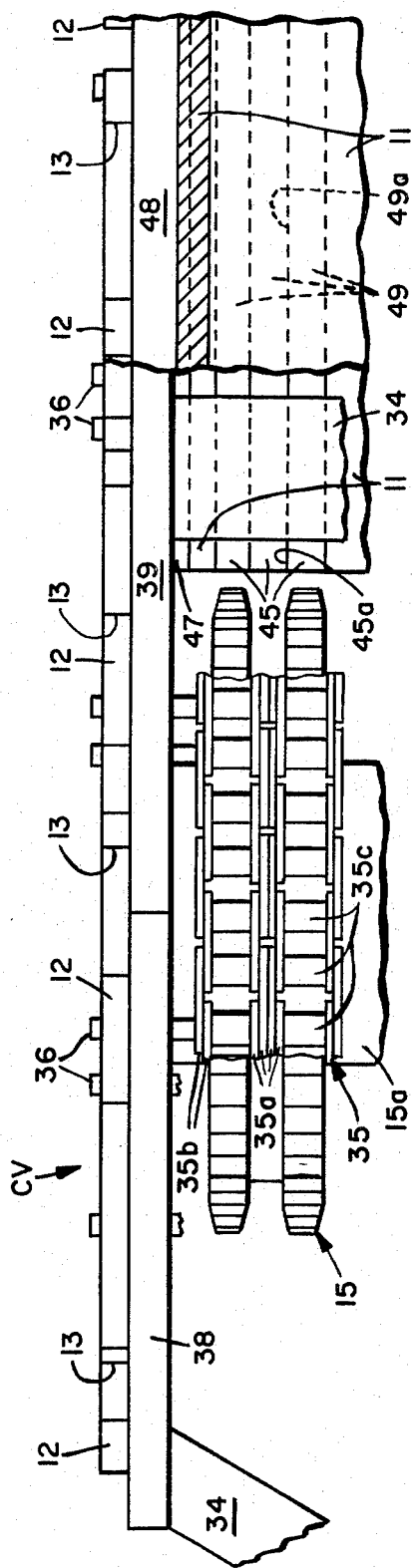
FIG. 3 is an elevational view of the exit end of the conveyor of the invention with parts broken away to better illustrate the structure of the conveyor, such view being taken in the general direction of line 3—3 of FIG. 1c.
Figure 4:
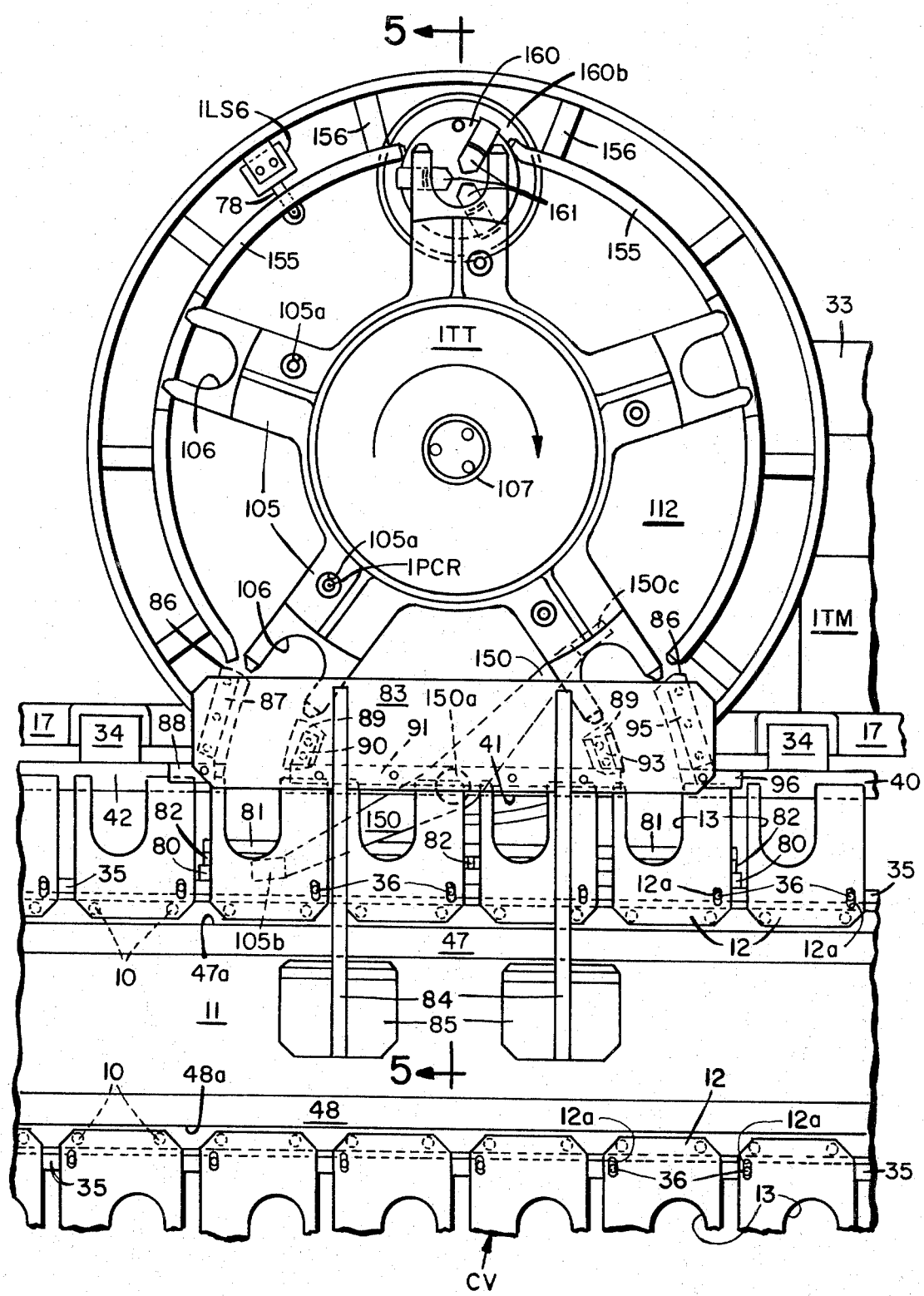
FIG. 4 comprises a top plan view of a stellate turntable or workpiece holder support means and a section of the coveyor located at work station I in the path of travel of the conveyor.
Figure 7:
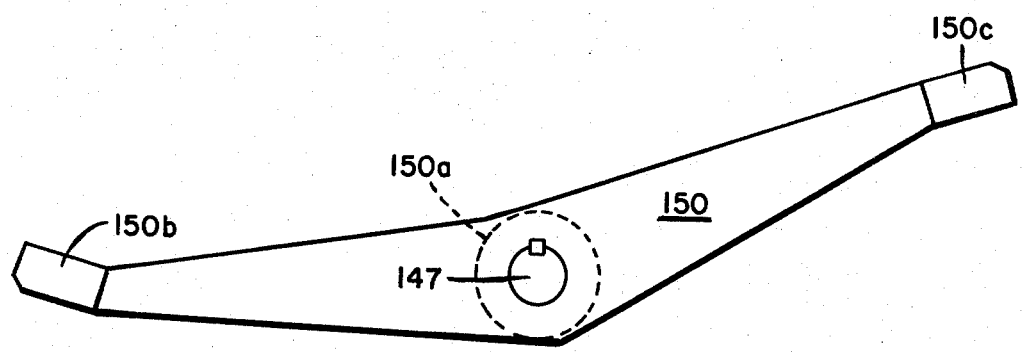
FIGS. 7 through 12 are enlarged detail views of parts of the apparatus shown in FIGS. 4 and 5.
Figure 8:
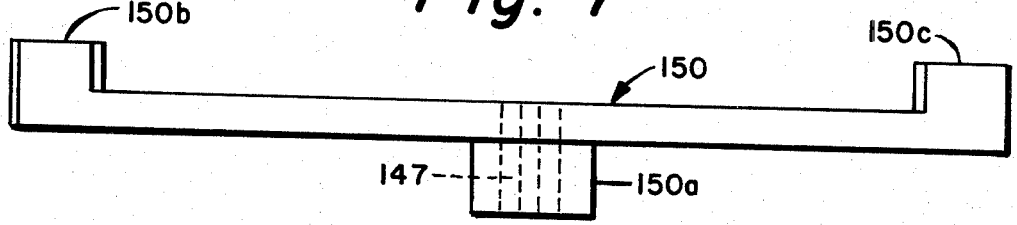
Figure 9:
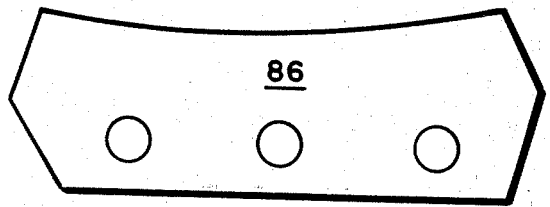
Figure 11:
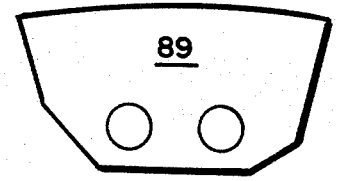
Figure 10:
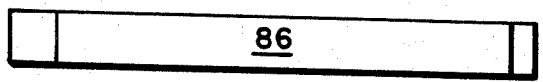
Figure 12:
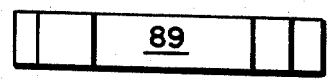

With further reference to FIGS. 2 through 5, a guide rail or track 47 embodying in the top thereof a groove or channel 47a is attached to the top of main support beam 11 adjacent the front edge thereof and each conveyor plate, such as 12, has a pair of downwardly extending guide projections, such as 10, affixed to the bottom of the respective plate adjacent the inner edge of the plate and such projections extend downwardly into said groove or channel 47a provided in rail or track 47. (See FIG. 5). The projections such as 10 may, but need not necessarily be, rollers if such is found to be expedient. Guide rail or track 47 extends for the full length of beam 11 as shown in FIGS. 2 and 3. An arrangement similar to that just described is provided adjacent the back edge of beam 11 and includes a guide track or rail 48 embodying in the top thereof a channel or groove 48a as best illustrated in FIG. 4. Guide track or rail 48 also extends for the full length of beam 11.

The back sides of a set of conveyor chain guide rails 45 (FIGS. 3 and 5) and 49 (FIG. 3) are attached to the front and back faces, respectively, of beam 11 near the top of such beam, such guide rails also extending for the length of beam 11. Guide rails 45 and 49, embody in the exposed faces thereof, guide channels or grooves 45a and 49a, respectively, into which the interconnecting center plates 35a (FIG. 3) of the previously mentioned double drive chain 35 extend in a relatively snug but slidable relationship with such grooves or channels, as illustrated in FIG. 5. Similarly, the lower surfaces of the upper interconnecting plates, such as 35b, of conveyor drive chain 35 slide along the upper surfaces of the respective guide rails 45 and 49. Described in a different way, the extending portions of guide tracks or rails 45 and 49 fit in between the center plates and the upper and lower plates of double chain 35 to support and guide such chain, during movement thereof, without undue friction between such guide tracks or rails and the interconnected plates and rods or pivot pins such as 35c of chain 35. It is believed expedient to point out at this time that each conveyor plate such as 12 is provided with an orifice or slot such as 12a (FIGS. 4 and 5) extending vertically through the respective plate near the inner edge and adjacent one side edge thereof, and chain 35 is provided with a plurality of evenly spaced apart and upwardly extending conveyor plate movers or actuators such as 36 (FIGS. 3, 4 and 5) each of which extends upwardly through the slot 12a provided in a respectively associated conveyor plate such as 12. Each conveyor plate mover or actuator 36 is preferably an upwardly extending extension of a selected one of the interconnected bars or pivot pins of chain 35 and, therefore, such chain, and its associated sprockets 14 and 15, are selected so that the links of the chain are of a length such that the movers or actuators, such as 36, can be extensions, such as that mentioned, and the plates are thereby evenly spaced apart along the length of the chain to form the conveyor CV as previously discussed.

The outer ends of plates 12 are supported at the front of conveyor CV by a series of slide tracks comprising a semicircular slide track 38 at the left hand end of conveyor CV (FIG. 3) a longitudinal slide track such as 39 which is connected to the front right hand end of curved slide track 38 and extends from there to a point adjacent the left hand end of a relatively short section of a longitudinal slide track provided at work station V. The series of slide tracks at the front of the machine further includes additional sections of longitudinal slide tracks extending between each work station and relatively short sections of such slide tracks provided at each of the work stations I through IV. Such arrangement of slide tracks or track sections will best be understood with reference to FIG. 4 in which reference 40 designates a section of longitudinal slide track extending between work station I and work station II, reference 41 designates a relatively short longitudinal section of slide track whose right hand end (viewing FIG. 4) extends from a point near the left hand end of slide track section 40, and reference 42 designates a section of longitudinal slide track whose right hand end (also viewing FIG. 4) extends from a point near the left hand end of slide track section 41 to the front end of a second semicircular slide track section provided at the right hand end of conveyor CV (viewing FIG. 1a) and which is similar to above mentioned semicircular slide track section 38. At the rear or back of conveyor CV there is provided a longitudinal slide track similar to sections 39, 40 and 42 but extending continuously between and connected to the rear ends of the semicircular sections of slide track provided at the ends of conveyor CV.

The slide track sections discussed above are supported by and attached to the upper ends of upwardly and inwardly sloping supports such as 34 (FIGS. 2, 3 and 4) whose lower ends are secured to the tops of the support beams such as 17 and 19 previously discussed and which are respectively provided at the left hand end (viewing FIGS. 2 and 3) and front side of conveyor CV (viewing FIGS. 2, 3 and 4). At the back or rear of conveyor CV the previously mentioned longitudinal slide track extending, at the rear of the conveyor, between the ends of the semicircular track sections provided at the ends of conveyor CV are supported by sloping supports similar to the supports, such as 34, provided at the front of the conveyor. The supports, such as 34, provided at the front and rear of conveyor CV are, of course, suitably spaced along the length of the conveyor so as to provide for adequate support of the slide tracks or track sections and, thereby, the outer ends of the conveyor plates such as 12 which slide therealong as further discussed hereinafter. At each of the work stations I through V the previously mentioned relatively short section of slide track, such as 41, is supported as shown for work station I illustrated in FIGS. 4 and 5. Referring to such drawing Figs. there is shown a pair of outwardly extending support brackets or arms such as 84 having bases such as 85 which are attached to the top of main beam 11. There is affixed to the bottom of the arms or brackets such as 84, near the outwardly extending ends thereof, a support plate such as 83 having attached to the bottom thereof an upright support 91. The previously mentioned relatively short section of slide track 41 at work station I is attached to the bottom of support 91 as illustrated in FIG. 5. The similar support arrangements at each of the work stations II through V are not shown in the drawings for purposes of simplification thereof, but will be apparent from the support arrangement shown at work station I as in FIG. 5.

Referring again to FIG. 2, taken in conjunction with FIG. 3, an electric conveyor drive motor CM is mounted on the top of a support plate 74 which extends between beam 26 and the corresponding beam at the back of conveyor CV and is securely attached to such beams. Motor CM includes an output shaft 69 on which is keyed for rotation therewith a suitable pulley 70. A drive belt 71 loops about pulley 70 and another pulley 68 which is keyed to the input shaft 67 of a conveyor gear reduction box CGB in a driving relationship with the gear arrangement of such gear box. The output shaft 66 of gear box CGB is connected to the input of an electrically controlled clutch-brake CCB. Shaft 63 which is rotatably supported in roller bearings 59 and 61 suitably mounted in a casing 52 to permit ease of rotation of such shaft 63 which is connected to CCB. A pinion gear 55 is keyed, in any convenient manner, to output shaft 63 for driven rotation therewith. The teeth of pinion gear 55 mesh with the teeth of a spur gear 54 in a driving relationship therewith, such spur gear being keyed, also in any convenient manner, to a drive shaft 50 for driven rotation of such shaft 50 in unison with the rotation of spur gear 54. Shaft 50 is rotatably supported in roller bearings 51 and 56 which are also suitably mounted in said casing 52 to permit each of rotation of shaft 50. In addition shaft 50 extends, at the lower end thereof, through the inner race of a roller bearing 57 suitable for rotatably supporting shaft 50.

The bottom edge of previously mentioned casing 52 is welded to the top of a plate 53 which is supported on the top of a pair of cross beams 28 and 29 suitably attached to previously mentioned upright supports or legs 18 and 19, respectively, and also suitably attached to the previously mentioned similar supports or legs provided at the back of conveyor CV. There is keyed to the upper end of shaft 50, for rotation therewith, the double chain drive sprocket 15 previously mentioned. As illustrated in FIG. 3, the previously mentioned double chain 35 loops about sprocket 15 with the teeth of such sprocket meshing with the links of chain 35 for driven movement of the chain by sprocket 15 and in the usual manner of such chain drive arrangements. It will be readily apparent that, by the entire chain drive arrangement first described, sprocket 15 is rotated and chain 15 is driven through its path of movement CVP (FIGS. 1a, 1b, and 1c) by motive power supplied thereto from motor CM through reduction gear box CGB and clutch-brake CCB in its energized condition and thence to shaft 50 as hereinafter discussed in more detail in an operational example of the invention.

Figure 17:
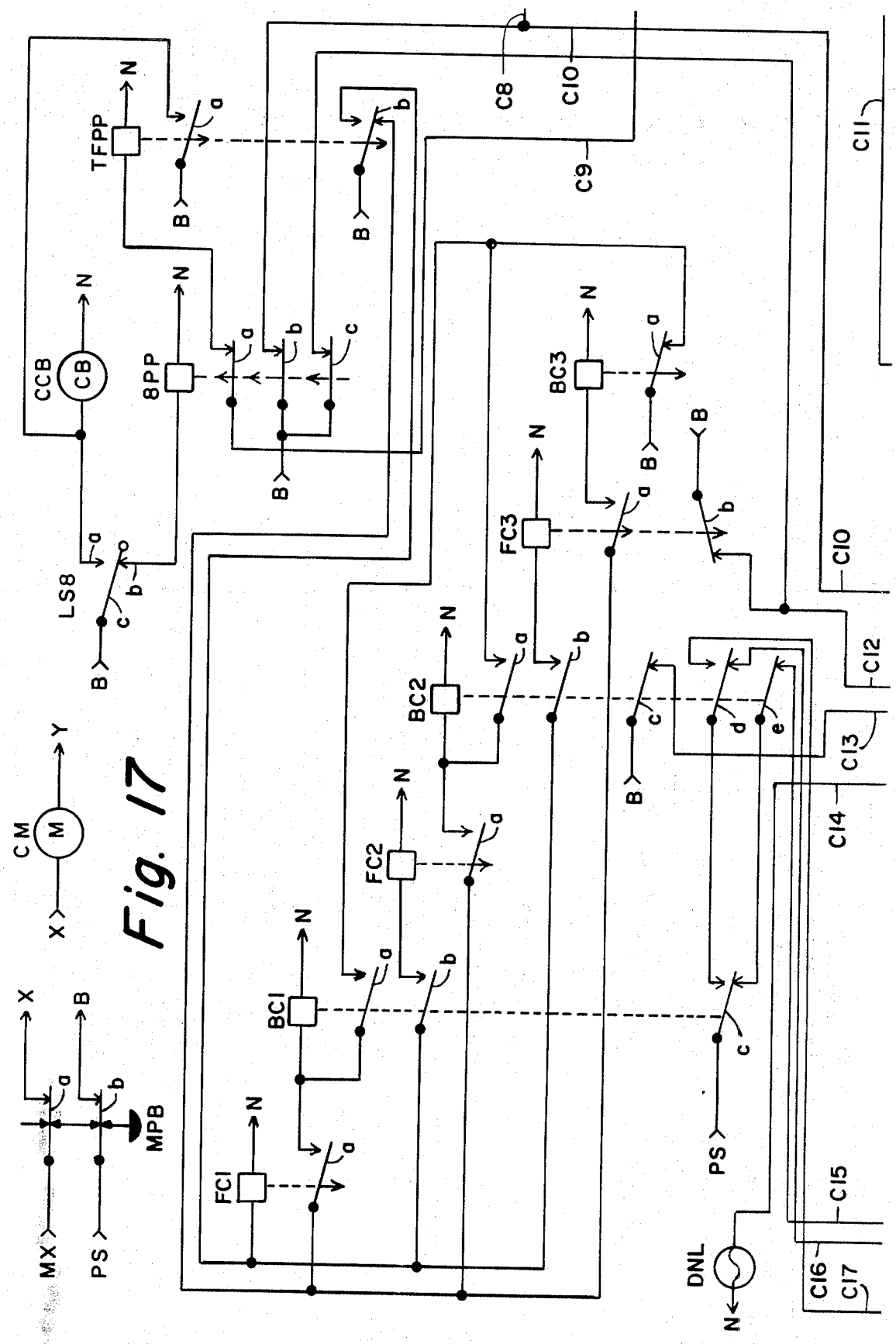
FIGS. 17 through 20 are pneumatic and electrical schematic drawings which, when arranged as shown in FIG. 21, illustrate one form of a control system for the apparatus of the present invention.

It should be pointed out at this time that there is also keyed to the shaft 63, for rotation therewith, a cam wheel 64 having an actuator or pin 64a extending from the upper surface of the cam wheel and which contacts and depresses the actuating arm 79 of a limit switch LS8 a single time in every 360° of rotation of cam wheel 64 by shaft 63. As discussed in detail hereinafter in conjunction with FIG. 17 of the drawings, limit switch LS8 includes a pair of fixed electrical circuit controlling contacts $a$ and $b$, and a common movable contact $c$ which is normally biased, as by a spring, towards a closed or electrical circuit closing condition with contact $a$, there being at such time, no contact with contact $b$ which is or may be said to then be in an open, or electrical circuit interrupting or opening condition. When actuating arm 79 of limit switch LS8 is depressed as mentioned above, said biased contact $c$ is actuated to an open or electrical circuit interrupting condition with reference to contact $a$ (as shown in FIG. 17) and against the force of said biasing spring, and is then moved into contact with contact $b$ which is or may be said to then be in a closed or electrical circuit closing condition. The contacts $a$, $b$ and $c$ of limit switch LS8 are not shown in FIG. 2 but are shown in the previously mentioned electrical schematic drawings and will be discussed in more detail hereinafter in operational examples of the invention.

As previously mentioned, the apparatus at work station I is shown in detail in FIGS. 4 through 13 and it is pointed out that the apparatus at each of the other work stations II through V is identical to that shown for work station I except for modifications in the electrical controls for work stations III, IV and V, and which will be discussed hereinafter. Therefore, for purposes of simplification of the drawings and, with the exception of certain portions of the electrical schematics, only the apparatus at work station I is shown in the drawings in detail. In the schematic drawings (FIGS. 17 through 20) only the control circuitry, and electrical and pneumatic components for work station I are shown in their entirety. The control circuitry and electrical components for work stations II through V are shown only to the extent necessary for a complete understanding of the invention. This will be further discussed later in conjunction with FIGS. 17 through 20.

With further reference to FIGS. 4 through 13, there is shown a relatively short section of conveyor chain guide rail or track 80 (FIGS. 4 and 5) which is a mirror image of previously discussed rail or track 45 and which embodies a chain guide groove or channel 80a similar to groove or channel 45a in track or rail 45. A bracket 81 is secured to the front of main support beam 11 and rail or track 80 is supported by and secured to bracket 81 by means of suitable spacers such as 82. Chain guide or rail 80, in conjunction with the corresponding but opposite length of chain guide or rail 45 stabilizers conveyor chain 35 during its movement through work station I and during periods of dwell of such chain and conveyor plates, such as 12, at work station I as hereinafter discussed in more detail. Such arrangement will be readily apparent to those skilled in the art.

Figure 13:
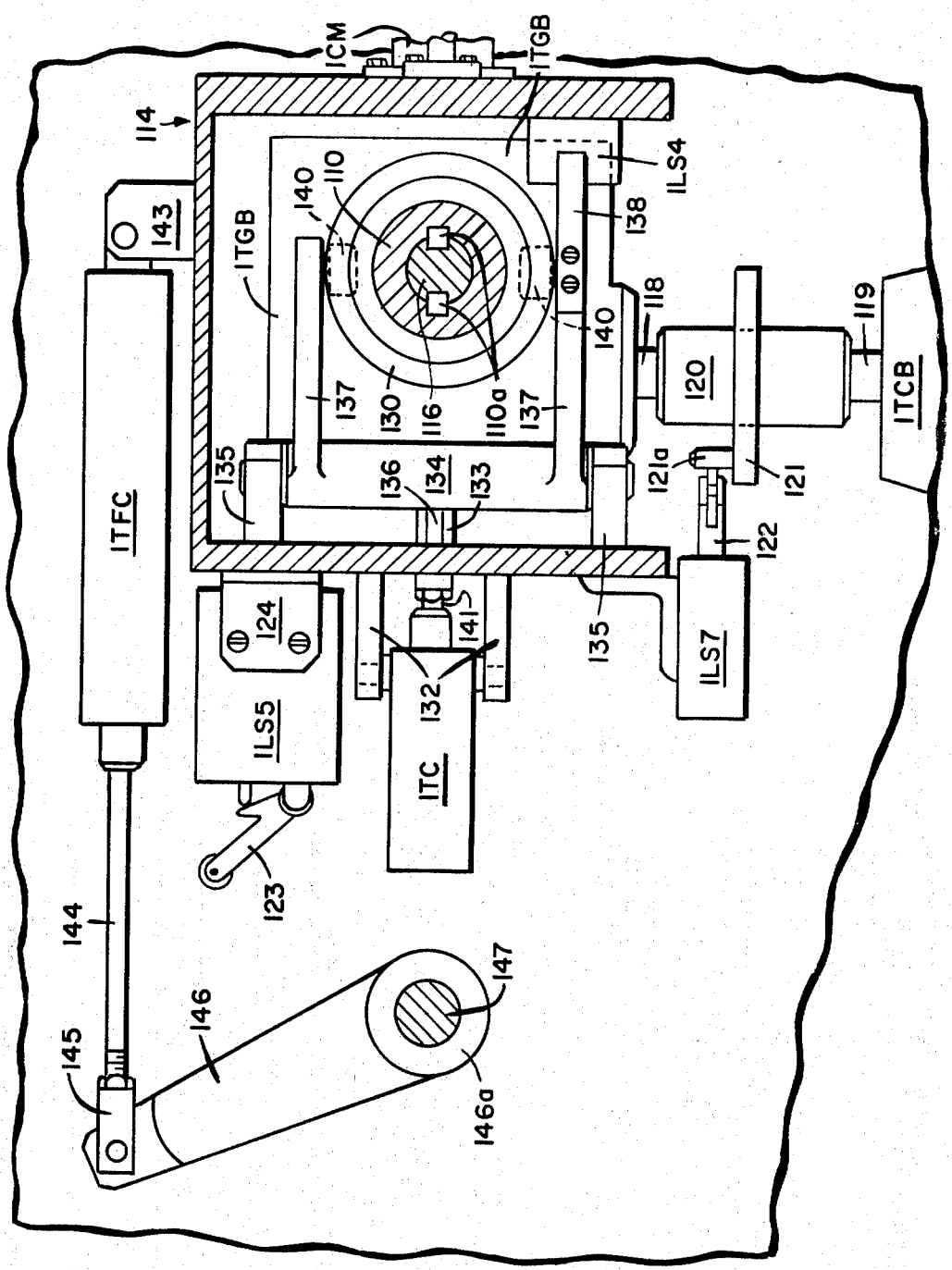
FIG. 13 is an enlarged detail plan view of the lower part of the apparatus of FIG. 5, such view being taken generally along line 13—13 of FIG. 5.

As previously mentioned, there is shown at shown at work station I a stellate turntable or workpiece holder support means 1TT including five radial arms such as 105 and each of which embodies adjacent the outer end thereof a recess such as 106. Each such recess is intended to receive, from a recess such as 13 embodied in the conveyor plates such as 12 of conveyor CV, the downwardly extending stem portions of workpiece holders or carrier blocks previously mentioned and which will be described hereinafter in connjection with FIGS. 15 and 16. Turntable or workpiece holder support means 1TT is affixed to a hub 107 (FIGS. 4 and 5) which is, in turn, keyed to the upper end of a vertically extending sleeve-type or hollow drive shaft 110 which extends downwardly through the hollow of a suitable sleeve support member 111 in a relatively snug but slidable relationship therewith. The upper end of a main drive shaft 116 (FIG. 13) extends into the hollow of sleeve-type drive shaft 110 adjacent the lower end of such shaft 110 and in a relatively snug but slidable relationship therewith (FIGS. 5 and 13). Drive shafts 110 and 116 are keyed to each other to provide driven and driving relationships, respectively, between the shafts while maintaining said sliding relationship therebetween. The keying relationship between said drive shafts is obtained by keys such as 110a (FIG. 13) inserted in cooperative keyways in shafts 110 and 116, the keys fitting tightly or relatively immovable in shaft 116, and snugly but slidably in shaft 110 to permit said slidable relationship between the shafts. By the arrangement just described, it will be apparent that rotation imparted to main drive shaft 116 will, in turn, be correspondingly imparted to drive shaft 110 and thence to previously mentioned hub 107 and turntable 1TT.

Figure 18:
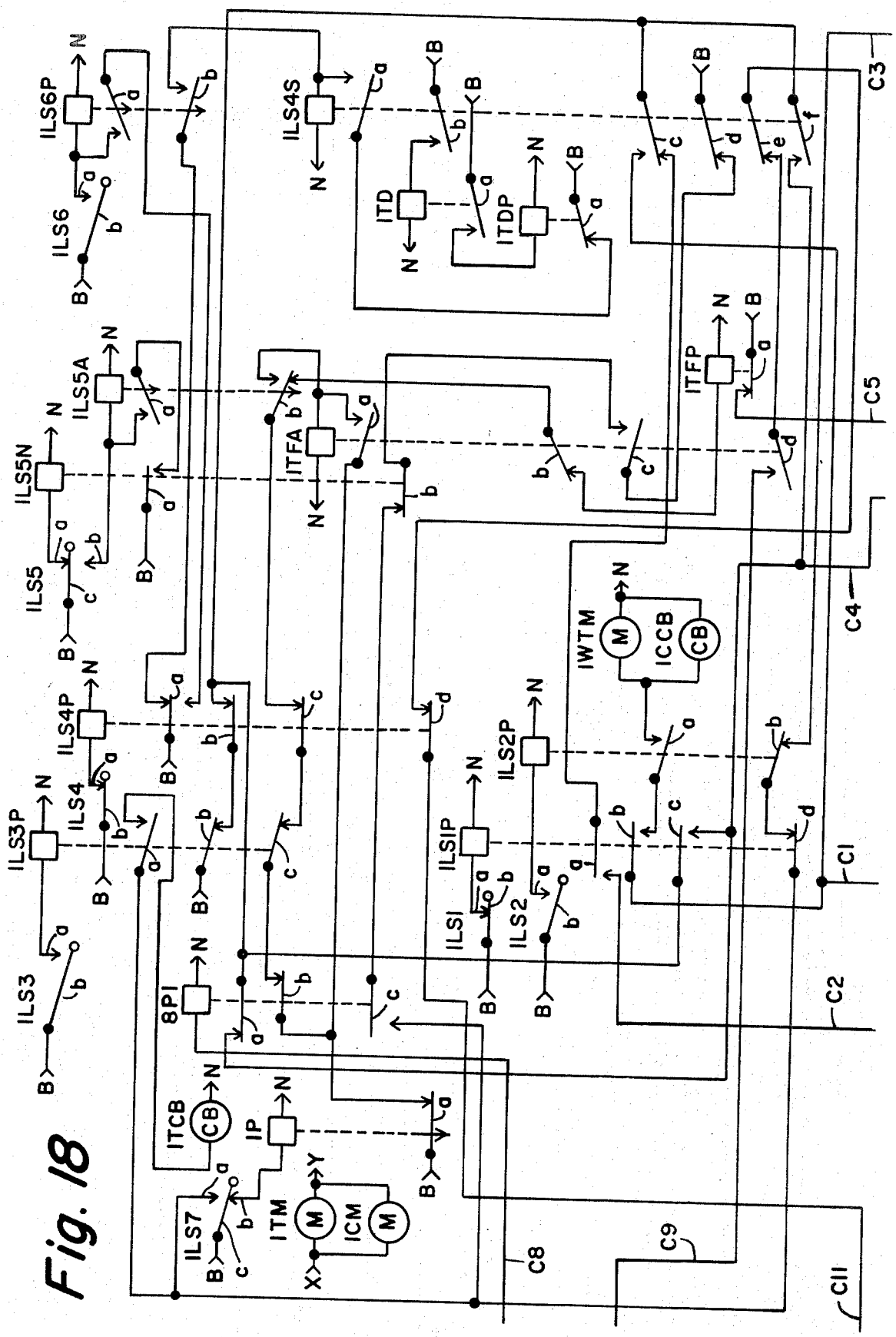

Sleeve support member 111 extends through and is attached to a support plate 113 which is affixed to the upper end of a vertical and open front support pedestal whose lower end rests on and is attached to the top of previously mentioned support platform 33. Member 111 also extends through the bottom of catch basin or pan 112 which is supported on said top support plate 113 and to sleeve support member 111. Catch basin or pan 112 has a diameter somewhat larger than that of turntable 1TT and such basin or pan is provided for the purpose of catching abrasive particles, slurries, ground particles, etc., that are produced by or used in the work operations performed as hereinafter described. The lower end of drive shaft 110 has affixed thereto and surrounding such drive shaft a pair of spaced apart ring-like or annular members 130 and 131, between which a pair of rollers, such as 140 (FIG. 13) are disposed for raising and lowering hollow drive shaft 110 in the manner hereinafter discussed in detail. The lower end of drive shaft 116 is rotatively coupled, as by a suitable sleeve coupling 117, (FIG. 5) to the output shaft of a gear box 1TGB (FIGS. 5 and 13) in the manner well known in the art. The input shaft 118 of gear box 1TGB is rotatively coupled, as by a suitable sleeve coupling 120, (FIG. 13) to the output shaft 119 of an electrically controlled clutch-brake 1TCB whose input shaft is rotatively connected to the output shaft of a turntable drive motor 1TM in any manner well known in the art. A ring-like or annular cam wheel 121 surrounds above mentioned sleeving coupling 120 and is attached thereto for rotation therewith. Cam wheel 121 (FIG. 13) includes on one face thereof an extending projection, or limit switch actuating pin 121a which is located on said face of cam wheel 121 so as to contact and depress the actuating arm 122 of a limit switch 1LS7 at a selected point in each rotation of cam wheel 121. As discussed in detail hereinafter in conjunction with FIG. 18 of the drawings, limit switch 1LS7 embodies a pair of fixed electrical circuit controlling contacts $a$ and $b$, and a common movable contact $c$ which is normally biased, as by a suitable spring, towards a closed or electrical circuit closing condition with contact $a$, while contact $b$ may be said to then be or is in an open, or electrical circuit interrupting or opening condition similarly to limit switch LS8 previously discussed. When actuating arm 122 of limit switch 1LS7 is depressed as mentioned above, said movable contact $c$ is actuated to an open or electrical circuit interrupting condition with reference to contact $a$ (as shown in FIG. 18) and, against the force of said biasing spring, is moved into contact with contact $b$ which is or may be said to then be in a closed or electrical circuit closing condition. The contacts $a$, $b$ and $c$ of limit switch 1LS7 are not shown in FIG. 13 but are shown in the previously mentioned electrical schematic drawings and will be discussed in more detail hereinafter in operational examples of the invention.

Returning to catch basin or pan 112 and to FIG. 5 of the drawings, such pan or basin embodies a circular hole or orifice 112a extending through the bottom of such pan or orifice and whose periphery is surrounded by an annular collar 112b which is attached to the upper surface of pan 112 and extends above such surface to a selected height. A fluid pressure actuated chuck 160 extends upwardly through said orifice 112a and said collar 112b and a flange or annular collar 160a surrounds and is affixed to the periphery of chuck 160 adjacent the lower end of such chuck, such collar 160a including a portion 160b overhanging said collar 112b in basin or pan 112. Such arrangement is intended, to the extent possible, to prevent the previously mentioned abrasives, abrasive particles or slurries etc. from falling down into the apparatus located below pan or basin 112. Chuck 160 and its associated apparatus will be further discussed hereinafter.

Catch basin or pan 112 also includes, extending through the bottom thereof, a sleeve member 149 which extends through a circular orifice or hole 112c embodied in said bottom, and which is attached to said basin or pan and extends somewhat above the upper surface of the bottom of the basin or pan. A bearing member 148 is attached to the bottom of previously mentioned support plate 113 and a vertically extending actuating shaft 147 for a workpiece-holder transfer arm 150, to be hereinafter discussed, extends through said sleeve member 149, through said bearing 148 and through an orifice or hole 113a in support plate 113 which is of a sufficient diameter to permit free rotative actuation of said actuating shaft 147. The lower end of shaft 147 rotatively rests in and such shaft is supported by a bearing member 151 whose bottom is attached to the top of previously mentioned support platform 33. The upper end of shaft 147 extends through and is affixed to the hub portion 150a of a workpiece-holder transfer arm 150 (FIGS. 4, 5, 7 and 8) described below in more detail. Shaft 147 also extends through and is affixed to a hub portion 146a of a crank arm or transfer arm actuator 146 for workpiece-holder transfer arm 150. The otherwise free end of crank arm or transfer arm actuator 146 is pivotally connected in a clevis 145 attached to the otherwise free end of a piston rod 144 extending from one end of a pressurized fluid actuated motor or transfer arm cylinder 1TFC whose second end is pivotally supported by a suitable bracket 143 secured to pedestal 114 (FIG. 13). Transfer arm 150 includes at its outer ends upwardly extending portions 150b and 150c (FIGS. 7 and 8) which contact the previously mentioned downwardly extending stem portions of the workpiece holders or carriers and, thereby, effect transfer of such holders or carriers by pushing such stem portions thereof as hereinafter described.

A limit switch 1LS5 is secured to a bracket 124 which is, in turn, attached to pedestal 114. An actuating arm 123 of switch 1LS5 is located so that its free end will be contacted and depressed by crank arm 146 towards the end of an actuation of such crank arm from left to right (viewing FIG. 13) through a selected arc of travel or movement as hereinafter further discussed. Switch 1LS5 embodies a pair of fixed electrical circuit contacts $a$ and $b$ and a movable contact $c$ which are not shown in FIGS. 5 and 13 but are shown in the previously mentioned electrical schematics to be discussed later. However, it will be expedient to point out at this point, that movable contact $c$ of switch 1LS5 is normally biased, as by a suitable spring, into an electrical circuit closing condition with contact $a$ there then being no electrical circuit closed or completed through contact $b$ which is then said to be in its open or circuit interrupting condition. When actuating arm 123 of switch 1LS5 is depressed as mentioned above, movable and common contact $c$ of switch 1LS5 is actuated out of contact with contact $a$ of such switch and into contact with contact $b$ of the switch. Contacts $a$ and $b$ are then said to be in their open and closed conditions, respectively, and such terms will be used hereinafter with respect to switches and relays to describe whether an electrical circuit is in an open or interrupted condition, or in a closed or completed condition. Such terms and their use in the manner stated will be readily recognized by persons having ordinary skill in the art.

As further shown in FIGS. 4 and 5, there is attached to catch basin or pan 112 a plurality of upwardly and inwardly sloping supports such as 156 and to the top of which is secured guard or guide rail sections such as 155 which extend in circular arcs just above the outer ends of the radial arms such as 105 of turntable 1TT when such turntable is in its lowered position. Such guard or guide rail sections are provided to assure that workpiece holders or carriers being supported in the recesses such as 106 adjacent to and embodied in the ends of arms 105 do not move outwardly in said recesses during rotation of turntable 1TT, that is, to assure that the workpiece holders remain in a relatively exact position in said recesses during the intermittent rotations of turntable 1TT through each of its previously mentioned 72° arcs of rotation.

A turntable actuating pressurized fluid motor or cylinder 1TC is shown in FIGS. 5 and 13, such motor or cylinder being pivotally supported at one end thereof by a pair of brackets such as 132 which are affixed to pedestal 114. The otherwise free end of the piston rod 141 of motor or cylinder 1TC is provided with a clevis 133 wwhich is pivotally connected to the otherwise free end of an actuating arm 136 of a modified type of bell crank assembly including a shaft or pivot portion 134 (FIG. 13) a pair of outwardly extending actuating arms such as 137, and said arm 136. Shaft or pivot portion 134 of such assembly is pivotally mounted between a pair of suitable support brackets such as 135 which are secured to pedestal 114 in the interior thereof. The end of actuating arm 136, opposite said free end thereof, is affixed to the center of said shaft or pivot portion 134 of said crank assembly. The previously mentioned rollers such as 140 are rotatably supported on the free ends of the arms such as 137 of the crank assembly and, as illustrated in FIGS. 5 and 13, extend into the space between previously mentioned annular members 130 and 131 affixed to previously discussed drive shaft 110. By such arrangement and as will be readily apparent, drive shaft 110 and, thereby, turntable 1TT are raised and lowered accordingly as pressurized fluid is supplied (viewing FIGS. 5 and 13) to the left hand or right hand ends, respectively, of fluid motor or cylinder 1TC. This will be further discussed hereinafter in operational examples of the invention.

A pair of limit switches 1LS3 and 1LS4 having actuating arms 125 and 126, respectively, are attached to pedestal 114 in the interior thereof as shown in FIG. 5. One end of an actuating lever 138 for such limit switches is affixed to the free end of one of the actuating arms such as 137 of the previously mentioned bell crank assembly as best illustrated in FIG. 13 and, when such actuating arm moves up and down, lever 138 is correspondingly moved so that its free end alternately contacts the free ends of said actuating arms 125 and 126 of limit switches 1LS3 and 1LS4, respectively, thereby alternately depressing such actuating arms to actuate electrical circuit controlling contacts embodied in each said switch. Switch 1LS3 embodies a set of electrical contacts including a fixed contact or contact member $a$ and a movable contact or contact member $b$, contact member $b$ being spring biased away from an electrical circuit closing condition with contact $a$ but being actuated to a closed condition with contact $a$ when said lever 138 depresses arm 125 of switch 1LS3. Switch 1LS4 embodies a set of electrical contacts $a$ and $b$ which are similar to those of switch 1LS3 and, therefore, need not be described in detail. However, it is pointed out that the lowered condition of turntable 1TT is considered to be the normal condition thereof and, therefore, actuating arm 126 of switch 1LS4 is normally depressed by lever 138 as shown in FIG. 5, and the contacts $a$ and $b$ of such switch are thereby normally actuated, against the force of the spring biasing of contact $b$, into electrical circuit closing contact with each other. As with the previously discussed limit switches, contacts $a$ and $b$ of switches 1LS3 and 1LS4 are shown only in the electrical schematic drawings and will be discussed hereinafter in conjunction therewith.

It is pointed out at this time that turntable 1TT and its associated apparatus at work station I is maintained in the desired position thereof adjacent conveyor CV by platform 33 in conjunction with an extension 114$a$ (FIG. 5) of pedestal 114, such extension being attached to pedestal 114 as well as to previously mentioned plate 113 affixed to the top of pedestal 114. A suitable spacer 78 is attached to the left hand face of extension 114$a$ (viewing FIG. 5) and to the front face of previously mentioned support beam 17, thereby assuring the correct retention of turntable 1II in juxtaposition to conveyor CV as mentioned above. A first pair of oppositely disposed workpiece holder guide plates or members such as 86 and 89 (FIGS. 4, 5 and 9 through 12) are secured to and supported by the bottom edges of upright supports 87 and 90, respectively, whose upper edges are affixed to previously mentioned support plate 83. A guide channel for the stem portions of workpiece holders during the transfer of such holders from conveyor CV to turntable 1TT (FIG. 4) is thereby provided by said first pair of guide members 86 and 89. Similarly, a second pair of oppositely disposed workpiece holder guide plates or members such as 86 and 89 are secured to and supported by the bottom edges of a pair of upright supports 95 and 93, respectively, whose upper edges are affixed to previously mentioned support plate 83. A guide channel for the stem portions of workpiece holders during the transfer of such holders from turntable 1TT to conveyor 1TT (FIG. 4) is thereby provided by said second pair of guide members 86 and 89. The guide plates such as 86 and 89 attached to supports 95 and 93, respectively, are mirror images of the corresponding guide plates such as 86 and 89 attached to supports 87 and 90, respectively, and, therefore, the configurations of said guide plates are adequately shown in FIGS. 9 through 12 of the drawings.

Figures 20, 21:
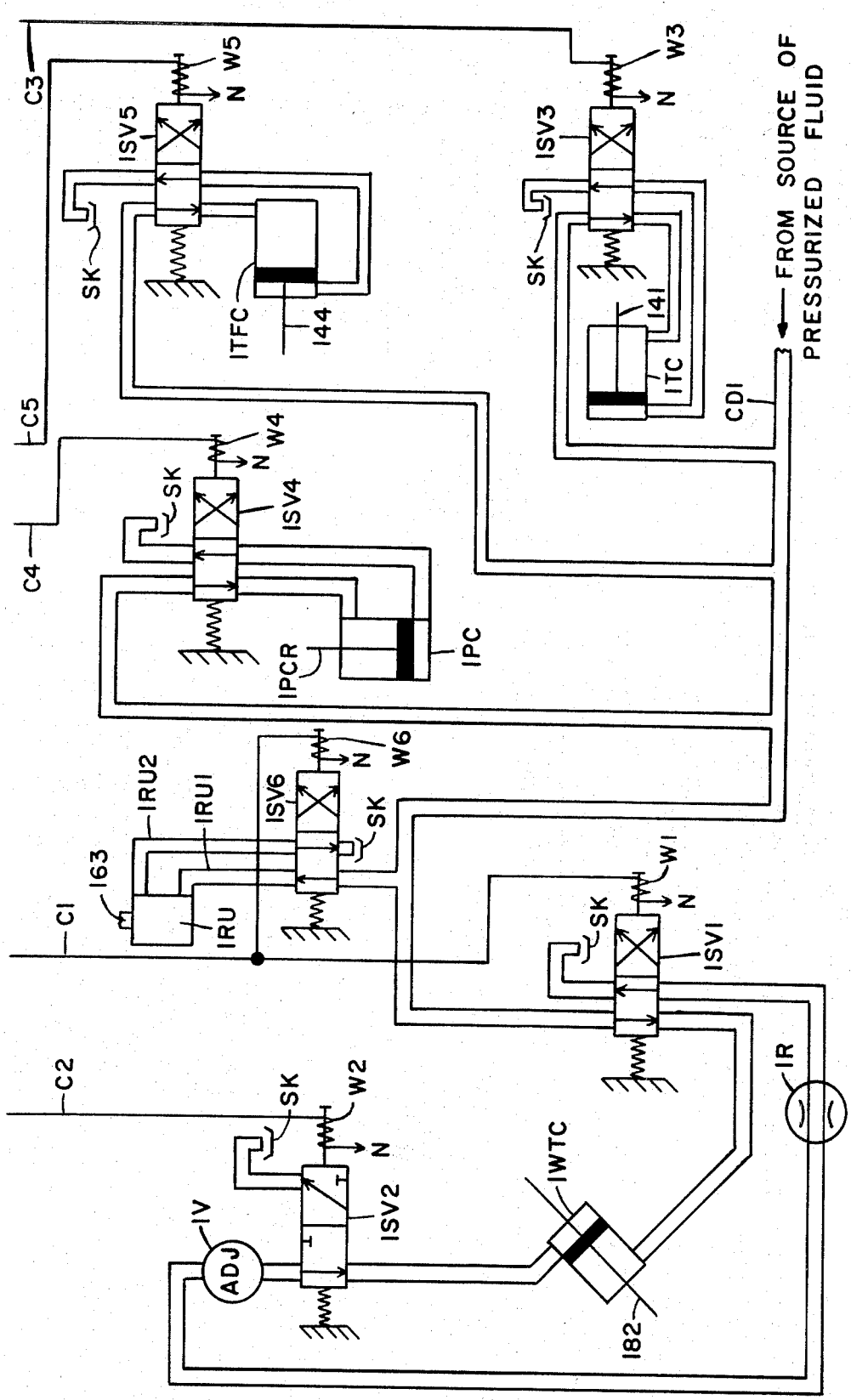
FIG. 21 is a chart illustrating the manner of arranging the schematic drawings of FIGS. 17 through 20 so that the continuity of the electrical conductors extending between such drawing figures can be readily followed or traced.

Referring again to previously mentioned pressurized fluid actuated chuck 160, such chuck includes a set of three jaws such as 161 (FIGS. 4, 5 and 15) which are open to receive and which close to grip the aforementioned downwardly extending stem portions of the workpiece holders handled by the apparatus of the invention. Chucks such as 160 are well known in the art and chuck 160 may, for example, be a Model 450 penumatically actuated chuck such as manufactured and sold by Northfield Precision Instrument Corporation whose address is 4400 Austin Boulevard, Island Park, Long Island, New York 11558, such chuck being adapted to receive and grip said stem portions of workpiece holders or carriers as mentioned above. Each such Model 450 chuck comes complete with an air tube assembly such as 163 and a rotary union such as 1RU shown in FIGS. 5 and 6 of the drawings. Rotary union 1RU is also shown in FIG. 20 of the drawings which will be discussed hereinafter. As illustrated in FIG. 6 air tube assembly 163 of chuck 160 comprises a set of concentric tubes including an outer tube 163$a$, an inner tube 163$b$ which extends through tube 163$a$ with a first pressurized fluid passage 163$c$ extending for the length of tubes 163$a$ and 163$b$ in between the inner surface of tube 163$a$ and the outer surface of tube 163$b$. Tube 163$b$ embodies a pressurized fluid passage 163$d$ which extends through the length of such tube. Rotary union 1RU into which the bottom end of tube assembly 163 extends (viewing FIG. 5) is provided with a pair of pressurized fluid conduit connections 1RU1 and 1RU2 (FIG. 6) through which pressurized fluid such as compressed air is selectively and alternatively supplied to said passages 163c and 163d, respectively, of tube assembly 163, while the other of such passages is connected to atmosphere or a suitable fluid sink as hereinafter further discussed. When pressurized fluid is supplied to passage 163c in tube assembly 163, chuck 160 is actuated to open its jaws, such as 161, to receive therewithin the downwardly extending stem portion of one of said workpiece carriers as mentioned above. When pressurized fluid is supplied to passage 163d in tube assembly 163, chuck 160 is actuated to close its jaws, such as 161, to grip said downwardly extending stem portion of said workpiece carrier which was, as just mentioned, previously received within said jaws. The actuation of the jaws such as 161 of chuck 160 will be further discussed hereinafter in a discussion of the pneumatic schematic drawing, FIG. 20. However, if additional information relative to chuck 160 is desired, the above named Northfield Precision Instrument Corporation can be contacted to obtain descriptive material relating to pneumatically actuated chucks such as 160.

Referring again to FIG. 5, tube assembly 163 of chuck 160 extends upwardly through the bore of a vertically disposed hollow drive shaft 162 (see also FIG. 6) in a relatively tight and rotatable relationship therewith. A pulley 171 is keyed to the outer periphery of drive shaft 162 adjacent the lower end thereof and in a driving relationship therewith. A drive belt 173 is looped around pulley 171 and another pulley 172 which is keyed to the output shaft of an electric motor 1CM in a driven relationship therewith. The upper end of drive shaft 162 (viewing FIG. 5) extends into the lower input end of an electrically actuated clutch brake 1CCB which is secured to the bottom of a sleeve member 165, to be discussed. The lower end of a second hollow drive shaft 162a (viewing FIG. 5) extends into the upper output end of clutch brake 1CCB and such shaft 162a thence extends upwardly through a suitable supporting roller bearing 167 housed in sleeve member 165, a pair of lower and upper rotational ball bearings 166 and 164, respectively, also housed in sleeve member 165, and thence to the bottom of chuck 160 to which it is secured for driven rotation of such chuck. Tube assembly 163 extends, of course, upwardly through the bores or hollows of shafts 162 and 162a and into the bottom of chuck 160 for actuation thereof as described above and again discussed hereinafter in operational examples of the invention. Sleeve member 165 and its associated apparatus is supported by a suitable bracket such as 170 which is attached to such sleeve member and to pedestal 114 as shown in FIG. 5.

A fluid pressure actuated turntable positioning cylinder 1PC (FIG. 5) is attached to a suitable support bracket 174 which is attached to the top surface of catch basin 112. The upwardly extending free end of piston rod 1PCR of cylinder 1PC is disposed so that it is aligned or coincides with the rotational path of travel or movement of upwardly tapering holes, such as 105a, provided in each radial arm such as 105 of turntable 1TT, each such hole being, of course, equidistant from the center of rotation of turntable 1TT as best shown in FIG. 4. When turntable 1TT is in correct rotational position, pressurized fluid is supplied to cylinder PCR to actuate the piston rod upwardly so that its free end enters the hole such as 105a in the respective radial arm, such as 105, then positioned above cylinder 1PC and thereby assures relatively precise rotational positioning of turntable 1TT as well as locking turntable 1TT in its rotational position which it occupies at such time. This will be further discussed hereinafter.

A limit switch 1LS6 (FIG. 4) is secured to the interior of the upwardly extending sidewall of catch basin 112 at a location preceding the work location in the rotational path of travel of turntable 1TT at work station I. (See FIG. 1a). Limit switch 1LS6 is also located at a height on said sidewall of catch basin or pan 112 such that the free end of actuating arm 78 will be contacted and depressed by each workpiece holder carried in the recess, such as 106, of each radial ram, such as 105, moved past the location of switch 1LS6. If a radial arm which does not carry a workpiece holder moves past the switch, such switch is not actuated. The purpose of such arrangement will be discussed later. However, it is pointed out, at this time, that, similarly to previously discussed limit switch 1LS3, switch 1LS6 embodies a pair of electrical circuit controlling contacts comprising a fixed contact $a$ and a movable contact $b$. Contact $b$ is normally biased, as by a suitable spring, to an open position or an electrical circuit open condition with reference to contact $a$, that is, out of contact with contact $a$. Contact $b$ is actuated to a closed or an electrical circuit closing condition with contact $a$ each time a radial arm, such as 105, of turntable 1TT carries a workpiece holder past switch 1LS6. Contacts $a$ and $b$ of switch 1LS6 are not shown in FIG. 4 of the drawings but are shown in a conventional manner in the electrical schematic drawings hereinafter discussed.

There is shown in FIG. 15, on an enlarged scale, the end of one of the radial arms, such as 105, of turntable 1TT, such arm supporting in its respective recess, such as 106, the previously mentioned downwardly extending stem portion 176a of one type of workpiece holder or carrier block, such as 176, the handling of which may be conveniently performed by the apparatus of the present invention. Workpiece holder 176 is shown as having an upper semispherical configuration or surface similar to the convexly curved surface of the workpiece holder 52 shown in FIG. 5 of the previously mentioned patent to W. C. Tripp. Holder 176 may, for example, support on or in its upper semispherical portion, a plurality of lens blanks such as 177, the exposed portion of each of which is to be ground to a contour of an outer segment of a sphere as represented by the dotted line 177a on the upper lens blank 177 on holder 176. Following the grinding of the lens blanks supported on or carried by each workpiece holder or carrier block such as 176, each respective holder or carrier block is transferred to a work station for polishing of the ground surfaces of the lens blanks as previously mentioned. The downwardly extending stem portion such as 176a of each workpiece holder 176 is engaged by the jaws, such as 161, of pneumatic chuck 160 for rotation of the respective workpiece holder as also previously mentioned.

FIG. 16 illustrates another type of workpiec holder 196, including a downwardly extending stem portion 196a, and which the apparatus of the present invention can also be used for handling. The downwardly extending stem portion 196a of holder 196 is similar to that of holder 176 and, therefore, is not illustrated in its entirety in FIG. 16 for purposes of simplification of the drawings. However, as is apparent, stem portion 196a may be handled by chuck 160 in the manner similar to that discussed for stem portion 176a of workpiece holder 176. Holder 196 may, for example, support on or in its upper portion a single relatively large diameter lens blank such as 195 having an exposed surface which it is desired to grind to a curved convex contour represented by the dotted line 195a and to then polish such ground surface. It is believed well to again point out at this time that the apparatus of the present invention can be used to handle numerous types of workpieces other than lens blanks and which it is desired to automatically and economically handle in mass numbers for work operations, such as engraving, machining, cutting etc. operations to be performed on the workpieces.

FIG. 14 illustrates with a minimum of detail a work tool assembly of a type which may be used in the grinding and polishing of lens blanks for example. The structure of such assembly per se forms no part of the present invention but the assembly is shown for the purpose of making the description complete by way of an illustration of the manner in which the controls for a work tool can be incorporated in the control system for the apparatus embodying the present invention. The work tool assembly shown in FIG. 14 includes a work tool 180 which may be used for the grinding and polishing of the lens blanks such as 177 supported on a workpiece holder such as 176 shown in FIGS. 14 and 15. Work tool 180 is shown as embodying a concave semispherical cavity 180a in which is suitably disposed abrasive or polishing materials and which corresponds to or has a very slightly larger radius than the upper convex semispherical portion of workpiece holder 176, as will be readily apparent to those skilled in the art. (See also the upper right hand corner of FIG. 5). The polishing or abrasive grinding materials mentioned above are not shown in the drawings for purposes of simplification thereof. Workpiece holder 176 and lens blanks 177, etc., shown in FIG. 14 were adequately described in conjunction with FIG. 15 and no further discussion thereof is considered necessary in conjunction with FIG. 14 except to point out that work tool 180 is reciprocately actuated, as hereinafter discussed, through a sloping path of movement or travel indicated in FIG. 14 by the broken line extending between the center of the cavity 180a in tool 180 and workpiece holder 176.

Work tool 180 is attached at its upper end to the lower end of a drive shaft 181 which rotatively extends through the bore of a hollow piston rod 182 of a pressurized fluid cylinder or motor 1WTC. The upper end of drive shaft 181 is in the form of a spline shaft which is an integrant part or extension of shaft 181. The internal structure of cylinder or motor 1WTC and the structure of the portion of piston rod 182 within such cylinder is not shown in the drawings but the structures of such components and of shaft 181 may, for example, be similar to motor or cylinder 15, piston rod 27, and shaft 14, respectively, disclosed in U.S. Pat. No. 2,758,571, issued Aug. 14, 1956 to D. D. R. Mackintosh for an Axially Reciprocable Motor.

An annular cam wheel 182a surrounds and is attached to piston rod 182 adjacent the upper end thereof and a spur gear 184 is keyed to the output shaft 183 of a suitable gear reduction box 1WTGB for driven rotation by such output shaft. The input to gear reduction box 1WTGB is from a suitable electric motor 1WTM which is preferably energized and driven by direct current. The teeth of spur gear 184 mesh with the teeth of the spline shaft portion of drive shaft 181 for driven rotation thereof. Cylinder or motor 1WTC is affixed to one surface of a support plate 185 whose other surface is attached to an upright support pedestal 187. Similarly, Motor 1WTM is secured to one surface of a support plate 186 which is also secured and supported by pedestal 187. A third support plate 192 is also attached to and supported by pedestal 187 and a pair of upper and lower limit switches 1LS1 and 1LS2, respectively, are secured to the exposed surface of plate 192 so that the ends of the actuating arms 189 and 190, respectively, of said limit switches are contacted, and actuated or depressed by the upper and lower surfaces of cam wheel 182a accordingly as piston rod 182, drive shaft 181, and work tool 180 are in their upper or raised position shown in FIG. 14, or in their lower or lowered position hereinafter further discussed. By the arrangement shown in FIG. 14 it will be apparent that drive shaft 181 and work tool 180 are supported so that they can be rotatively driven while also being raised or lowered during such rotation. The raising and lowering of piston rod 182 and its associated components is performed by supplying pressurized fluid to the lower or upper ends, respectively, of motor or cylinder 1WTC. This is further discussed later in conjunction with the pneumatic schematic figure of the drawings.

Limit switches 1LS1 and 1LS2 each include a pair of electrical circuit controlling contacts which are actuated between closed and open positions (electrical circuit closing and open conditions) according to whether the actuating arm of the respective switch is or is not actuated by said cam wheel 182a on said piston rod 182. The pair of contacts of switch 1LS1 include a fixed contact *a* and a movable contact *b* which is biased, as by a suitable spring, to an open or electrical circuit opening condition away from its associated fixed contact *a*, and is actuated to its closed or electrical circuit closing condition against fixed contact *a* and against the biasing force of said spring when actuating arm 189 of the switch is actuated by cam wheel 182a as shown in FIG. 14. The pair of contacts of switch 1LS2 also include a fixed contact *a* and a movable contact *b* which is biased, as by a suitable spring, to an open or electrical circuit opening condition away from its associated fixed contact *a*, and is actuated to its closed or electrical circuit closing condition against fixed contact *a* and against the force of said biasing spring when actuating arm 190 of the switch is actuated by cam wheel 182a on said piston rod 182 shown in FIG. 14. Contacts *a* and *b* of limit switches 1LS1 and 1LS2 are not shown in FIG. 14 but are shown in the electric schematic drawings to be hereinafter discussed. It is pointed out at this time, however, that the raised position of the components 180, 181 and 182 as shown in FIG. 14 is considered to be the normal position or condition of such components and therefore contacts *a* and *b* of switch 1LS1 normally are in their closed position or electrical circuit closing condition, while contacts *a* and *b* of switch 1LS2 are normally in their open position or electrical circuit opening condition.

The bottom or previously mentioned support pedestal 187 (FIG. 14) rests on the upper surfaces of a pair of suitable support feet 188 whose bottom surfaces rest on the floor or a suitable support platform such as 193.

The height and positioning of pedestal 187 is selected, in conjunction with the height and positioning of the apparatus of FIG. 5, so that work tool 180 is aligned as indicated by the previously mentioned broken line shown in FIGS. 5 and 14 and so that the lower end of such work tool, when in its raised position shown in such drawing figures, is substantially the distance shown away from a workpiece holder such as 176 positioned at the work location at work station I. The described alignment and positioning of the apparatus of FIGS. 5 and 14 must, of course, be precisely maintained for correct work operations and, for this reason, it will be expedient if pedestal support feet 188 (FIG. 14) are correctly positioned and supported on the top surface of support platform 33 (FIG. 5) or on a front extension of such platform, such extension, if provided, being securely joined with and attached to platform 33.

Figure 19:
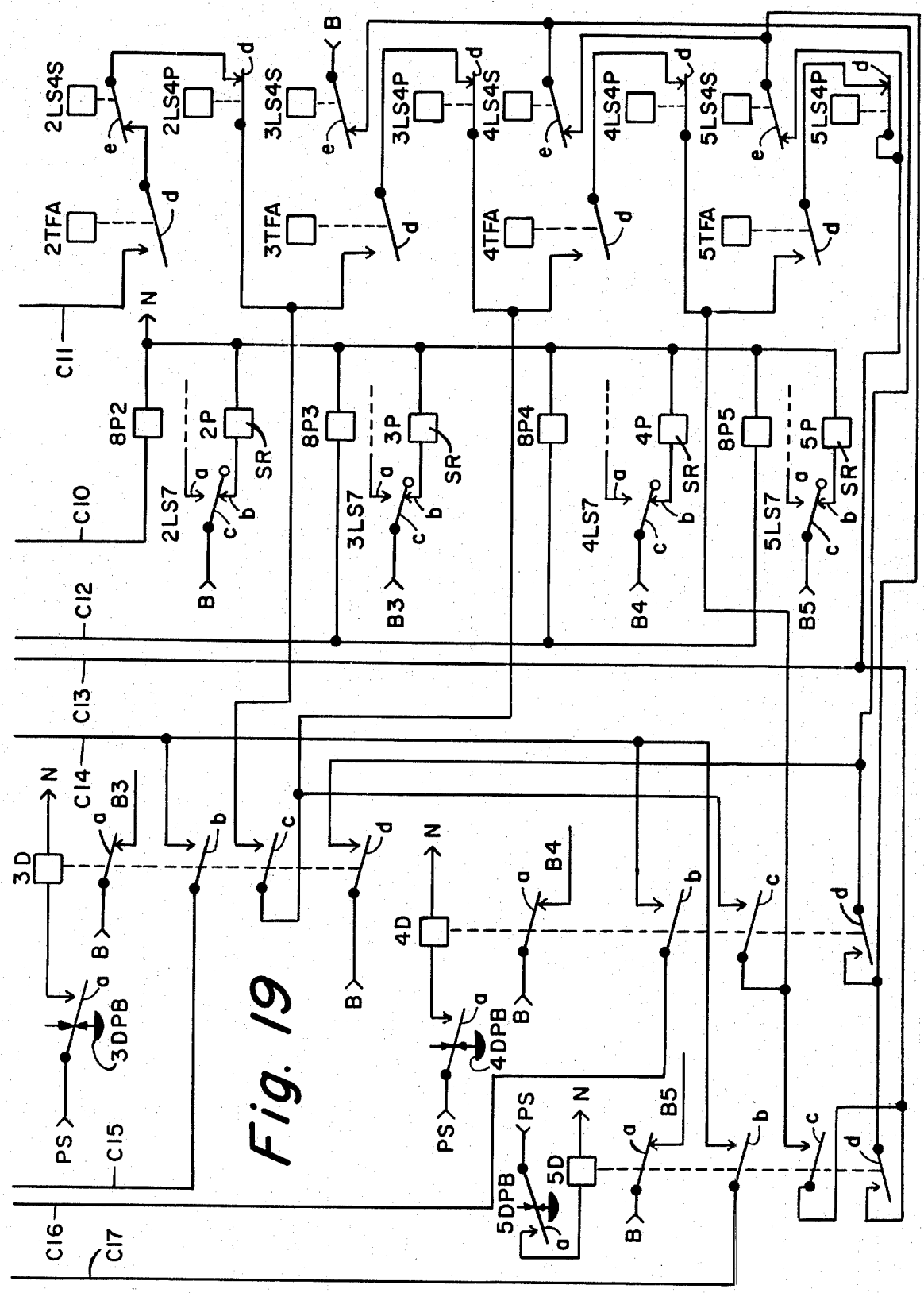

There is schematically illustrated in FIGS. 17 through 20 one form of an electrical and pneumatic control system for the apparatus thus far describe.d In order that the control system will be more readily understood, the electrical components and control circuits etc. which are associated with conveyor CV are to the extend possible shown in FIG. 17, the electrical components and control circuits associated with work station I are to the extend convenient or possible shown in FIG. 18, the pneumatic or pressurized fluid components associated with work station I and the control circuits for such components are confined, to the extent possible, to FIG. 20, and FIG. 19 illustrates, only to the extent necessary for an understanding of the invention, electrical components and control circuitry for work stations II through V. As previously mentioned, the apparatus associated with each of the stations II through V, excluding the electrical control components and circuitry, is identical to that shown and described for work station I. The electrical control components and circuitry for work station II are also identical to that shown and described for work station I. However, for purposes which will hereinafter become apparent, there are several additional electrical components and minor modifications in the electrical control circuitry associated with each of the work stations III, IV and V, as compared with those for work stations I and II.

For purposes of simplification of the drawings and brevity, to the extent possible, of the description of the control system or systems covered by FIGS. 17 through 20 of the drawings and without sacrifice of a ready understanding of the system or systems controlling the apparatus of the invention, the following expedients are employed to attain said brevity and simplification.

A plurality of electrically controlled or actuated relays are employed and the control winding of each such relay is represented by a rectangle with the designation of such relay being disposed above the rectangle representing the respective relay winding. The electrical circuit controlling contacts of each such relay are shown below their respectively associated control winding (rectangle) and a broken line extends between each respective relay control winding and its contacts therebelow. The movable member of each set of relay contacts of a respective relay is designated by a different small case letter and the fixed contact points of each relay and with which each movable contact member makes contact will be termed a front contact (downwardly pointing contact against which the respective movable contact member is closed only when the respective relay control winding is energized) or a back contact (an upwardly pointing contact against which the respective movable contact member is closed only when the respective relay control winding is deenergized.) Some of the relays shown are so-called slow acting relays and, in such case, an arrow extends through each movable contact or contact member of such relays and points in the direction in which the respective relay (the movable contact members of the relay) are slow acting. Slow acting relays include slow release relays in which the movable contact members thereof are soemwhat slow in opening or breaking contact with the fixed front contacts of the relays upon deenergization of the control windings of the relays and, therefore, are also slow in making contact with the fixed back contacts upon deenergization of the relay control windings. Slow pickup relays are relays whose movable contact members are somewhat slow in breaking contact with the fixed back contacts of the relays upon energization of the control windings of the relays and, therefore, are correspondingly slow in closing against the front contacts of the slow pickup relays upon energization of the relay control windings. Several slow release relays are shown in the drawings (FIG. 19) but have no contacts thereof shown. In such cases the rectangle representing the control winding of the respective relay has a lead line between such rectangle and letters SR to indicate that the relay is a slow release relay.

Several manually operable push button electrical circuit controlling switches MPB, 3DPB, 4DPB and 5DPB are shown in FIGS. 17 and 19, and each such push button switch is of the type whose electrical contacts are normally open but are actauted to and remain in an electrical circuit closing condition when the respective push button is manually pushed or pressed. After the pressing of each respective push button and the closing of the contacts thereof, such contacts are reactuated to a circuit interrupting condition only when the respective push button is manually pulled out of the pressed or closed condition thereof. The electrical conductors or leads shown in FIGS. 17 through 20 of the drawings are designated by reference characters only when they extend between the sheets of such drawing figures and, for purpose of simplification and clarity of the apparatus drawing FIGS. 2, 4, 5, 13 and 14, no electrical leads or conductors, or pressurized fluid conduits, are shown therein but the apparatus components in such drawing figures which have electrical conductors or conduits connected thereto are designated in FIGS. 17 through 20 of the drawings by the same reference characters as the identical components in said FIGS. 2, 4, 5, 13 and 14. An exception to this expedient is the pressurized fluid conduits or flexible hoses or pipes connected, as shown in FIGS. 6 and 20, to previously discussed rotary union 1RU.

A plurality of electric solenoid actuated or controlled pressurized fluid flow control valves 1SV1 through 1SV6 are shown in FIG. 20 in the conventional manner, that is, by conventional symbols, and the pressurized fluid motors or cylinders 1WTC, 1PC, 1TFC, and 1TC shown in FIGS. 5, 13 and 14 are shown schematically in FIG. 20 but are designated by respectively identical reference characters as in said drawings FIGS. 5, 13 and 14. The electrically controlled clutch-brakes and electric motors shown in FIGS. 2, 5 13 and 14 are represented in FIGS. 17 and 18 by circles with the letters M or CB disposed within the circles to designate whether the respective component is a motor or clutch brake. The reference character of each such component shown in FIGS. 17 and 18 is disposed above each respective circle and corresponds to that used in FIGS. 2, 5, 13 and 14 to designate the same component. A time delay relay 1TD is shown in FIG. 18. Such a type of relay is well known and such a relay, following an energization of its control winding, closes its front contact or contacts (front contact *a* of relay 1TD) only after the expiration of a time delay period for which the time delay relay is selected or set. An indication light or lamp DNL is also shown in FIG. 17 and its purpose will be discussed hereinafter.

The previously mentioned contacts *a* and *b* of limit switches 1LS1 through 1LS4 and of limit switch 1LS6 are shown in FIG. 18. The previously mentioned contacts *a*, *b*, and *c* of limit switches 1LS5 and 1LS7 are also shown in FIG. 18. The previously mentioned contacts *a*, *b* and *c* of limit switch 1LS8 are shown in FIG. 17. In addition, there are shown in FIG. 19 a set of contacts *a*, *b* and *c* of each of a plurality of limit switches 2LS7 through 5LS7 which are associated with work stations II through V, respectively.

There is provided a suitable source of direct current power of proper voltage and capacity for operation of the electrical clutch brakes, motor 1WTM, the previously mentioned electrical solenoid actuated fluid flow control valves, and said lamp DNL, but such source is not shown in the drawings for purposes of simplification thereof. However, the positive and negative terminals of said source are designated PS and N, respectively. This will be discussed more hereinafter. There is also provided a suitable source of alternating current for the energization of motors CM, 1CM, and 1TM, and of proper voltage and capacity for the energization of such motors. However, such cource is also not shown in the drawings but the terminals of such source are designated MX and Y, respectively. A suitable source of pressurized fluid, such as compressed air, is also provided for the actuation of the pneumatic or pressurized fluid actuated apparatus shown in FIG. 20.

OPERATIONAL EXAMPLES OF THE INVENTION

For the purpose of a first operational example of the invention it will be assumed that conveyor CV and turntable 1TT are, relative to one another, in their positions shown in FIGS. 1a and 4, and pressurized fluid is supplied to pipe or fluid conduit CD1 (FIG. 20) as well as to the pipes or fluid conduits associated with work stations II through V but not shown in the drawings for purposes of brevity. At such time the pressurized fluid supplied to conduit CD1 will actuate the pistons and piston rods of cylinder 1TC, 1TFC, 1PC and 1WTC to their positions shown in FIG. 20, and actuate chuck 160 to open its jaws such as 161. Turntable 1TT is, therefore, in its lowered position, transfer arm 150 is in its unactuated position as illustrated in FIGS. 4 and 5, while work tool 180 is in its raised position shown in FIGS. 5 and 14. The piston rod 1PCR of cylinder 1PC is also in its lowered position. It will now be further assumed that master push button switch MPB or control (FIG. 17) is manually pushed or depressed and alternating current (X) is supplied over contact *a* of switch MPB to energize conveyor motor CM (FIG. 17) turntable 1TT motor 1TM and chuck 160 motor 1CM (FIG. 18). The corresponding turntable and chuck motors at work stations II through V are, of course, also energized at such time. The depressing of push button switch MPB also supplies over contact *b* of the switch direct current (B) from the previously mentioned source thereof (PS) to the control windings of the relays whose energizing circuits are closed over the respective limit switches at such time. Thus, relay 8PP (FIG. 17) relays 1P, 1LS4P, 1LS5N, 1LS1P (FIG. 18) and relays 2P through 5P (FIG. 19) become energized to close their front contacts. Relays 8P3, 8P4 and 8P5 (FIG. 19) also become energized.

Upon the energization of relay 8PP (FIG. 17) as mentioned above, and following the delay time provided by the slow pickup feature of such relay, the relay closes its front contact *a* to prepare a later traced energizing circuit for relay TFPP (FIG. 17). The closing of the front contact *b* of relay 8PP closes an energizing circuit for relay 8P1 such circuit extending from said front contact *b* over conductor C8 to the winding of relay 8P1 and thence through such winding to terminal N of the power source. The closing of front contact *b* of relay 8PP also closes an energizing circuit for relay 8P2 (FIG. 19) such circuit extending from such contact *b* over conductor C10 to the control winding of relay 8P2 and thence through such winding to said terminal N. The closing of front contact *c* of relay 8PP closes an additional energizing circuit for relays 8P3, 8P4 and 8P5 (FIG. 19) such circuit extending from such contact *c* over conductor C12 to the control windings of relays 8P3, 8P4 and 8P5, and thence through such control windings to terminal N. The energization of relay 8P1 (FIG. 18) closes at front contact *a* of such relay an energizing circuit for solenoid winding W4 of valve 1SV4 (FIG. 20) such circuit extending from back contact *b* of relay 1LS3P, front contact *b* of relay 1LS4P, said contact *a* of relay 8P1 and thence over conductor C4 to said winding W4. The closed conditions of back contact *b* of relay 1LS3P and front contact *a* of relay 1LS4P reflect the lowered position of turntable 1TT and, therefore, valve 1SV4 is actuated, by the energization of its control winding W4, to supply pressurized fluid from conduit CD1 to the lower end of cylinder 1PC while the upper end of such cylinder is connected to previously mentioned fluid sink SK. Cylinder 1PC is thus actuated to raise its piston rod 1PCR to precisely position turntable 1TT and lock it in its position shown in FIGS. 1a and 4 as previously mentioned.

The closing of front contact *a* of relay 1P at this time also closes an energization circuit for relay 1TFP (FIG. 18) such circuit extending from front contact *a* of relay 1P (FIG. 18) over front contact *b* of relay 8P1, back contact *c* of relay 1LS3P and front contact *c* of relay 1LS4P (thereby assuring that turntable 1TT is fully lowered) back contact *b* of relay 1LS5A (thereby checking that transfer arm 150 (FIGS. 4 and 5) is in its unactuated condition at such time) back contact *b* of relay 1TFA and thence to the control winding of relay 1TFP which then picks up to close its front contact *a*. The closing of such front contact *a* closes an energizing circuit to solenoid winding W5 of fluid flow control valve 1SV5, such circuit extending over conductor C5 to winding W5. The energization of winding W5 actuates valve 1SV5 to supply pressurized fluid from conduit CD1 to the left hand end (viewing FIGS. 5 and 13) to rotate shaft 147 and actuate transfer arm 150 (FIGS. 4 and 5) to effect a transfer of a workpiece holder from the recess such as 13 in a conveyor plate such as 12 of conveyor CV and into the recess such as 106 of a radial arm such as 105 of turntable 1TT as illustrated schematically by the arrow in FIG. 1a extending between said recesses at the lower left hand part of turntable 1TT shown in FIG. 1a. Simultaneously, with such transfer a preceding workpiece holder is transferred by transfer arm 150 out of the recess in a radial arm of turntable 1TT and into the recess 13 in a conveyor plate of conveyor 12 as illustrated schematically by the arrow extending between such recesses at the lower right hand part of turntable 1TT in FIG. 1a. Similar transfers are correspondingly effected at work station II at this time, depending, of course, on whether there are workpiece holders on conveyor CV and at such station II for transfer thereof, or on whether workpiece holders are then being carried by the radial arms of turntable 2TT. Similar transfers may also be correspondingly effected at work stations III, IV and V at such time, depending, of course, upon the presence of workpiece holders on conveyor CV and on the turntables 3TT, 4TT and 5TT at said stations III, IV and V, and also depending upon whether it is the time for transfer of workpiece holders at stations III, IV and V, it being remembered that only single actuations of the transfer arms at such stations are effected for every three actuations of the transfer arms at stations I and II. This will be further discussed hereinafter.

Referring further to FIG. 13 of the drawings, when transfer arm 150 is actuated to effect workpiece holder transfers as discussed above, crank arm 146 contacts actuating arm 123 of limit switch 1LS5 towards the end of the transfer operation and depresses such arm to actuate the limit switch. The actuation of limit switch 1LS5 actuates movable contact c of such switch (FIG. 18) to break contact with contact a of the switch and subsequently close against contact b of the switch. Such actuation deenergizes relay 1LS5N, a holding circuit for relay 1LS5A is thereby prepared over back contact a of relay 1LS5N and, when relay 1LS5A picks up over its energizing circuit including said contact b of switch 1LS5 and thereby closes its front contact a, the holding circuit is completed and relay 1LS5A is maintained energized over back contact a of relay 1LS5N until relay 1LS5N is again energized over contact a of switch 1LS5 upon return of crank arm 146 and transfer arm 150 to their former positions. Relay 1LS5A is a slow release relay such as previously mentioned and the purpose of the slow release feature of this relay will be pointed out hereinafter. When relay 1LS5A is energized, as discussed above, back contact b of such relay opens to interrupt the previously described energization circuit for relay 1TFP which then releases and opens the energizing circuit to winding W5 of valve 1SV5. Such valve is then returned to its normal positon shown in FIG. 20 and the piston and piston rod 144 of cylinder 1TFC and thereby also actuated to their positions shown in FIG. 20 and thus return transfer arm 150 to its position shown in FIGS. 4 and 5.

The energization of relay 1LS5A, as described above, closes at front contact b of such relay an energizing circuit for relay 1TFA, and such relay picks up and closes a holding circuit for itself including its own front contact a and front contact a of relay 1P (FIG. 18). The opening of back contact b of relay 1TFA in the energizing circuit for relay 1TFP assures that this latter relay cannot again be energized until relay 1TFA releases and closes said contact b. Upon the previously mentioned return of transfer arm 150 and crank arm 146 to their normal positions, and the reenergization of relay 1LS5N, the holding circuit for relay 1LS5A is opened and such relay is deenergized. At such time, the slow release feature of relay 1LS5A assures that relay 1TFA closes its holding circuit over its own front contact a before the primary energizing circuit for such relay opens at front contact b of relay 1LS5A. The energization of relay 1TFA prepares at front contact c of such relay an energizing circuit for clutch brake 1TCB (FIG. 18) and an energizing circuit for winding W3 of fluid flow control valve 1SV3 (FIG. 20). These circuits extend from terminal B of the power source over back contact d of a relay 1LS4S, to be discussed, said front contact c of relay 1TFA, front contact b of relay 1LS5N, back contact c of relay 8P1 when deenergized as hereinafter discussed, and thence over said energization circuits for clutch brake 1TCB and winding W3, the first of such circuits including front contact a of relay 1LS3P, and second of such circuits including front contact d of relay 1LS1P, back contact b of relay 1LS2P, and conductor C3. The completion of these energizing circuits will be discussed hereinafter.

Relay 2TFA (FIG. 19) associated with work station II and corresponding to relay 1TFA, is energized by circuits corresponding to that just discussed in conjunction with work station I and, for purposes of the present operatonal example it will be assumed that both relays 1TFA and 2TFA are now energized. It will be further assumed that transfer at work stations III, IV and V are also made at this time of the transfers at work stations I and II, and, therefore, relays 3TFA, 4TFA and 5TFA (FIG. 19) have also been energized over circuitry similar to that discussed for relay 1TFA. Under such assumptions a pick-up circuit for relay TFPP (FIG. 17) associated with conveyor CV is closed. This circuit may be traced from terminal B of the power source over back contact c of a relay BC2 (FIG. 17) to be discussed, conductor C13 front contact c of relay 5LS4P (FIG. 19) front contact d of relay 5TFA, front contact d of relay 4LS4P, front contact d of relay 4TFA, front contact d of relay 3LS4P, front contact d of relay 3TFA, front contact d of relay 2LS4P, back contact e of relay 2LS4S, front contact d of relay 2TFA, conductor C11, front contact d of relay 1LS4P (FIG. 18) back contact e of relay 1LS4S, front contact d of relay 1TFA, conductor C9, front contact a of relay 8PP (FIG. 17) and thence through the control winding of relay TFPP to terminal N of the power source. Relays 2LS4S through 5LS4S in FIG. 19 and associated with work stations II through V, respectively, each correspond to relay 1LS4S shown in FIG. 18 for work station I and to be hereinafter discussed. Similarly, relays 2LS4P through 5LS4P shown in FIG. 19 and associated with work stations II through V, respectively, each correspond to relay 1LS4P (FIG. 18) associated with work station I. It is sufficient to point out at this point in the description that the front contacts of the -LS4P relays in the above traced energizing circuit for relay TFPP assure that all of the turntables 1TT through 5TT are in their lowered positions, and that the front contacts of the -TFA relays and the back contacts of the -LS4S relays in said energizing circuit assure that the transfers of all workpiece holders are completed and that any work being done at either of the work stations I and II is also completed. This will be further discussed hereinafter.

The energization of relay TFPP over the above-traced energizing circuit closes over front contact *a* of relay TFPP an energizing circuit for clutch brake CCB thereby energizing such clutch brake to actuate the clutch thereof to connect the output shaft 63 of clutch brake CCB to the output shaft of gear box CGB (FIG. 2) for driven rotation of conveyor chain drive sprocket 15, gears 54 and 55 (FIG. 2) and sprocket 15 being selected, in conjunction with conveyor chain 35 (FIG. 3) and conveyor plates 12 of conveyor CV so that a single revolution of said output shaft of clutch brake CCB will move chain 35 a distance equal to the spacing of two adjacent ones of said plates 12, that is, a distance equal to double the distance between the centers of the recesses such as 13 in any pair of adjoining plates such as 12 of conveyor CV. Just subsequent to the start of the rotation of said shaft 63, cam wheel 64 (FIG. 2) is rotated sufficiently that projection 64a no longer contacts the end of actuating arm 79 of limit switch LS8 and such arm is no longer depressed or actuated. This permits the biasing feature of movable contact *c* of switch LS8 (FIG. 17) to move such contact out of electrical contact with fixed contact *b* and into electrical contact with fixed contact *a* of such switch. The opening of contacts *b–c* of switch LS8 deenergizes relay 8PP which opens at its front contact *a* the previously traced energizing circuit for relay TFPP. Following the delay in the release of slow release relay TFPP, such relay opens its front contact *a* to open the previously mentioned energizing circuit for clutch brake CCB. The delayed opening of front contact *a* of relay TFPP is of sufficient duration to assure that an energizing circuit for clutch-brake CCB is closed over contacts *a–c* of switch LS8 before the energizing circuit for such clutch brake is opened at front contact *a* of relay TFPP. By such arrangement clutch-brake CCB remains energized for a complete revolution of output shaft 63 of clutch brake CCB at which time the actuating arm 64a of cam wheel 64 again contacts and depresses actuating arm 79 of limit switch LS8 (see FIG. 2) and contacts *a–c* of such switch open to deenergize clutch-brake CCB to apply the brake thereof and thereby immediately stop further rotation of shaft 63 and corresponding movement of conveyor CV as will be readily apparent. Immediately following the opening of contacts *a–c* of switch LS8, contacts *b–c* of such switch again close and the winding of slow pickup relay 8PP is again energized. Returning, however, to the release of relay 8PP when contacts *b–c* of switch LS8 opened, such release of relay 8PP opened contacts *b* and *c* of such relay and thereby opened the energizing circuits for relay 8P1 (FIG. 18) and relay 8P2 (FIG. 19) each of which relays release to open their front contacts. Relays 8P3, 8P4, and 8P5 are maintained energized over back contact *b* of relay FC3 to be discussed.

Upon the opening of front contact *a* of relay 8P1 by the deenergization of the control winding thereof as discussed above, previously traced control circuit for winding W4 of valve 1SV4 (FIG. 20) is interrupted and such valve is then actuated by its spring return means to supply pressurized fluid to the top of cylinder 1PC and connect the bottom of such cylinder to fluid sink SK. The piston and piston rod of cylinder 1PC are reactuated to their positions shown in FIG. 20 and turntable 1TT is no longer locked against rotation. When back contact *e* of relay 8P1 closes, subsequent to the deenergization of the winding of such relay, the previously described energizing circuit for winding W3 of valve 1SV3 (FIG. 20) is completed and such valve is actuated to supply pressurized fluid to turntable cylinder 1TC and thereby actuate piston rod 141 of such cylinder to raise turntable 1TT (FIGS. 5 and 13). The raising of turntable 1TT actuates limit switches 1LS4 and 1LS3 to open and close their contacts *a–b*, respectively, and relay 1LS4P releases and relay 1LS3P picks up, respectively. The picking up of relay 1LS3P closes at front contact *a* thereof the previously traced energizing circuit for 1TT turntable clutch brake 1TCB, such circuit including back contact *c* of relay 8P1. The energization of clutch brake 1TCB actuates the clutch of the clutch brake to supply driven rotation from the output shaft of 1TT turntable motor 1TM (FIG. 5) to the output shaft 119 (FIG. 13) of the clutch brake 1TCB and thence through sleeve coupling 120 to input shaft 118 of gear reduction box 1TGB which has a gear ratio such that drive shafts 110 and 111, and thereby turntable 1TT, are rotated through an arc of 72° of travel for each complete revolution of said shafts 118 and 119, and sleeve coupling 120. When cam wheel 121 is sufficiently rotated, following the start of the revolution of coupling 120, so that its projection 121a no longer contacts and depresses actuating arm 122 of limit switch 1LS7, the biasing feature of such switch actuates contacts *b–c* of the switch (FIG. 18) to an open condition and contacts *a–c* of the switch to a closed condition. The opening of said contacts *b–c* deenergizes relay 1P, but the slow release feature of such relay delays the opening of front contact *a* of the relay to assure that switch 1LS7 closes its contacts *a–b* to maintain clutch brake 1TCB energized when relay 1TFA is deenergized by the opening of its holding circuit at front contact *a* of relay 1P. The closing of contacts *a–c* of switch 1LS7 also maintains winding W3 (FIG. 20) of valve 1SV3 energized when relay 1TFA releases and opens at its front contact *e* the previously traced initial energizing circuits for clutch brake 1TCB and said winding W3. Thus 1TT turntable is maintained in its raised position and clutch brake 1TCB is energized to complete a 72° arc of rotation of turntable 1TT. Following a 360° rotation of sleeve coupling 120 (72° rotation of turntable 1TT) projection 121a on cam member 121 (FIGS. 5 and 13) again contacts and depresses actuating arm 122 of limit switch 1LS7, and contacts *a–c* of such switch are thereby opened to deenergize clutch brake 1TCB and thereby, actuate the brake of 1TCB to terminate further rotation of sleeve coupling 120 and stop cam wheel 121 so that its projection 121a maintains arm 122 of switch 1LS7 depressed. At the same time that clutch brake 1TCB is deenergized by the opening of contacts *a–c* of switch 1LS7, winding W3 of valve 1SV3 is deenergized (FIG. 20) and the spring return means of such valve reactuate the valve to supply pressurized fluid to cylinder 1TC so as to lower turntable 1TT. Contacts *b–c* of switch 1LS7 close immediately after the opening of contacts *a–c* of such switch, relay 1P is again energized and front contact *a* of such relay closes to prepare the previously traced energizing circuit for relay 1TFP (FIG. 18). When turntable 1TT is again in its fully lowered position, front contact *c* of relay 1LS4P is closed by the energization of such relay by limit switch 1LS4. When, as previously discussed, limit switch LS8 closes its contact *b–c* (FIG. 17) to energize relay 8PP following a movement of conveyor CV and, following the delay in the closing of front contacts *a*, *b* and c of relay 8PP due to the slow pickup feature of the relay, such contacts close and relay 8P1 (FIG. 18) as well as relays 8P2 through 8P5 (FIG. 19) are again actuated to their picked up conditions. The slow pickup feature or relay 8PP assures initiation of the turntable rotations at the work stations prior to the opening of the initiating circuits by the opening of the back contact c of the 8P-relays at the various work stations. Turntable 1TT is locked by the piston rod 1PCR of cylinder 1PC in its new rotational position, as previously discussed, for work to be done on workpieces supported on any workpiece holder moved, by the 72° of rotation of turntable 1TT, to the work location at work station I. The picking up of relay 8P1 also completes, at its front contact b, the pickup circuit for relay 1TFP which closes its front contact a to energize winding W5 of valve 1SV5 (FIG. 20) and, thereby, actuate cylinder 1TFC to move its piston rod 144 to effect another transfer of workpiece holders to and from the turntable 1TT as previously discussed and as mentioned above.

During the above described 72° of rotation of turntable 1TT, one of the radial arms such as 105 (FIG. 4) of such turntable passes limit switch 1LS6 and the actuating arm 78 of such switch is or is not contacted and depressed at such time according to whether a workpiece holder is or is not carried, respectively, in the recess such as 106 in the respective radial arm such as 105. If no workpiece is carried by the radial arm which passes limit switch 1LS6 the components and circuitry for work station I and shown in FIGS. 18 and 20 operate in the manner previously discussed to prepare for a subsequent 72° rotation of turntable 1TT etc. If, however, limit switch 1LS6 (FIG. 4) detects a workpiece holder carried by the radial arm of turntable 1TT which passes such limit switch, that is, if actuating arm 78 is momentarily contacted and depressed by a workpiece holder carried on the radial arm of turntable 1TT when such arm passes the switch, switch 1LS6 is actuated to momentarily close its contacts a–b (FIG. 18) and thereby energize relay 1LS6P which closes its holding circuit over its own front contact a including back contact a of relay 1LS4P, such latter contact being closed since turntable 1TT is, at such time, in its raised position for said 72° rotation thereof. Following the completion of the rotation of turntable 1TT and the resultant presentation of said workpiece holder to the work location at work station I (FIG. 1a) turntable 1TT is again lowered and, when it reaches its fully lowered position, relay 1LS4P (FIG. 18) opens its back contact a and closes its front contact a. Such opening of back contact a opens the holding circuit for relay 1LS6P but the slow release feature of such relay miantains front contact b of the relay closed until after front contact a of relay 1LS4P closes and picks up relay 1LS4S (FIG. 18) which then completes its holding circuit including its own front contact a and back contact a of a relay 1TDP discussed below. Contact b of relay 1LS6P subsequently opens to open the pickup circuit for relay 1LS4S.

The picking up of relay 1LS4S closes, at front contact b of such relay, an energizing circuit for previously mentioned time delay relay 1TD which closes its front contact a only following a selected period of time after the energization of the control winding of the relay. Such time delay relays are well known and the time delay period of such relay is selected or set in accordance with the time it takes to perform a work operation on the workpieces supported on the workpiece holder or support at the work location at work station I. The picking up of relay 1LS4S, as discussed above, closes at front contact c of such relay an energizing circuit extending over conductor C1 to control winding W1 (FIG. 20) of solenoid actuated valve 1SV1 which controls the raising and lowering of work tool 180 (FIG. 14). Such energization of winding W1 actuates valve 1SV1 to supply pressurized fluid through a suitable pressure reducer 1R to and through an adjustable valve IV and through a valve 1SV2 to the top of cylinder 1WTC to actuate piston rod 182 of such cylinder to lower work tool 180 (see FIG. 14) so that cavity 180a in such work tool surrounds the upper semispherical portion of the workpiece holder such as 176 at the work location at work station I and so that the workpiece such as 177 supported on said workpiece holder are contacted by material supported in said cavity 180a and suitable for performing desired work operations, such as grinding for example, on said workpieces. Reducer 1R assures desired grinding pressure of work tool 180 while pressure build-up time between the tool and the workpieces such as 177 on workpiece holder 176 can be adjustably controlled by valve IV which also assures a relative slow lowering of tool 180. It is expedient to point out at this point in the description that work tool 180 is raised, following a work operation, by the deenergization of winding W1 of valve 1SV1 and the energization of winding W2 of a solenoid actuated valve 1SV2. By such operation pressurized fluid is supplied through valve 1SV1 to the bottom of cylinder 1WTC while the top of cylinder 1WTC is connected through valve 1SV2 to fluid sink SK. The piston rod 182 of cylinder 1WTC is thereby actuated upwardly at a relatively high rate of speed to correspondingly actuate work tool 180 upwardly and rapidly terminate the work operation. The circuit for energizing winding W2 of valve 1SV2 will be discussed further hereinafter.

The previously discussed lowering of turntable 1TT following the arrival of the radial arm of such turntable carrying the workpiece holder presented to the work location at work station I, lowers the downwardly extending stem porton 176a of said workpiece holder into the jaws such as 161 of chuck 160 (FIG. 15). Upon the completion of the lowering of turntable 1TT, relay 1LS4P closes its front contact a and relay 1LS4S closes its front contact c to complete the energization circuit including conductor C1 as discussed above in conjunction with the discussion of the energization of winding W1 of valve 1SV1. Control winding W6 of valve 1SV6 (FIG. 20) is also energized at such time and valve 1SV6 is actuated to supply pressurized fluid, such as compressed air, to fluid conduit 1RU2 and thence to the upper part of rotaty union 1RU while connecting the lower part of union 1RU through fluid conduit 1RU1 to fluid sink SK or to atmosphere as desired. Said pressurized fluid flows through previously discussed air tube 163 of chuck 160 to actuate the jaws such as 161 of the chuck to close about said stem portion 176a of the workpiece holder 176 and tightly grip such stem portion. When work tool 180 (FIG. 14) is lowered as previously discussed, the actuating arms 189 and 190 of limit switches 1LS1 and 1LS2, respectively, are actuated so that contact a–b of limit switch 1LS1 opens and contact a–b of limit switch 1LS2 closes. Such actuation releases relay 1LS1P and picks up relay 1LS2P which close their back and front contacts b and a, respectively, to energize cluch brake 1CCB (FIGS. 5 and 18) and work tool drive motor 1WTM (FIG. 14). The energization of clutch brake 1CCB actuates the clutch thereof to connect the input shaft 162 of such clutch brake to output shaft 162a whose upper end is attached to the bottom of chuck 160. The rotation of shafts 162 and 162a by chuck drive motor 1CM (FIG. 5) at such time rotates chuck 160 and the supported workpiece holder. The above-mentioned energization of work tool motor 1WTM imparts rotation, through work tool gear box 1WTGB, to spur gear 184 which, in turn, rotatably drives shaft 181 and, thereby, work tool 180. The above described rotation of workpiece holder 176 and work tool 180 is, of course, for the purpose of performing the desired work operations, such as grinding or polishing for example, on the workpieces such as 177 supported on workpiece holder 176.

It is here pointed out that the previously traced energizing circuit for relay TFPP (FIG. 17) is open at back contact e of relay 1LS4S (FIG. 18) as long as relay 1LS4S remains energized thereby indicating that a work operation is in progress at work station I. This assures that conveyor CV will not be moved during the progress of such a work operation.

Following the time delay period of relay 1TD (FIG. 18) such relay closes its front contact a to energize relay 1TDP which then opens its back contact a to, in turn, open the holding circuit for relay 1LS4S and release such relay. The opening of front contact b of relay 1LS4S deenergizes time delay relay 1TD which immediately releases in preparation for a subsequent time delay actuation of the relay. The release of relay 1TD opens, at front contact a of such relay, the energization circuit for repeater relay 1TDP which also releases and closes its back contact a in preparation for another subsequent completion of the holding circuit for relay 1LS4S when such relay is subsequently energized for subsequent work operation to be performed. The release of relay 1LS4S opens, at front contact c of such relay, the previously mentioned energizing circuit for motor 1WTM and clutch brake 1CCB (FIG. 18) as well as the energizing circuit for windings W1 and W6 of valves 1SV1 and 1SV6 which then return to their positions shown in FIG. 20. The deenergization of motor 1WTM stops the rotation of work tool 180 and the deenergization of clutch brake 1CCB actuates such clutch brake to terminate the rotation of chuck 160. The closing of back contact c of relay 1LS4S, upon the release of such relay, closes the previously mentioned energizing circuit for winding W2 of valve 1SV2, such circuit including conductor C2 extending between FIGS. 18 and 20 of the drawings. Valves 1SV1 and 1SV2 are actuated as described, and work tool 180 is rapidly actuated upwardly to clear turntable 1TT and workpiece holder 176 for another 72° rotation of the turntable. The above-mentioned deenergization of winding W6 of valve 1SV6 and the resultant actuation of such valve to its position shown in FIG. 20, actuates chuck 160 (FIGS. 5, 14 and 15) to open its jaws 161 and thereby free workpiece holder 176. The actuation of work tool 180 upwardly, as mentioned above, causes opening of contacts a–b of limit switch 1LS2 to release relay 1LS2P, and at the end of such actuation, closing of contacts a–b of limit switch 1LS1 to pick up relay 1LS1P. The energizing circuit for winding W2 of valve 1SV2 is then deenergized so that valve 1SV2 is actuated to its position shown in FIG. 20 in preparation for another relatively slow actuation of work tool 180 in its downwardly moving workpieces contacting operation similarly to that discussed above. It should be remembered that relay 1TFA (FIG. 18), is held up or energized over its holding circuit, subsequent to its energization over its initial energizing circuit including front contact a of relay 1P, front contact b of relay 8P1 and front contact b of relay 1LS5A (FIG. 18). The energization of the latter relay indicates the actuation of workpiece holder transfer arm 150, and said relay 1LS5A is held in its energized condition until limit switch 1LS5 is actuated to open its contacts b–c and close its contacts a–c upon completion of a transfer operation, such as previously described, at work station I. Following the release of relays -LS4S associated with the work stations I and II at which work operations are performed, relay TFPP (FIG. 17) is again energized over front contact a of relay 8PP to initiate another movement of conveyor CV, as previously described, and another 72° rotation of the turntables such as 1TT as previously discussed.

Referring to FIGS. 18 and 20, the following points may be useful for a rapid and complete understanding of the control system shown in such drawing figures. Front contact a of relay 1P assures that turntable 1TT is in its correct position for workpiece transfers before such transfers are made and then initiates such transfers. Front contact a of relay 8P1 assures the raised position of piston rod 1PCR of cylinder 1PC and the resultant locking of turntable 1TT in its rotational position. Front contact b of relay 8P1 indicates the completion of a movement of conveyor CV and, in conjunction with said front contact a of relay 1P, causes energization of winding W5 of valve 1SV5 to actuate transfer cylinder 1TFC for workpiece transfers. Back contact c of relay 8P1 indicates a movement of conveyor CV in progress and initiates a 72° rotation of worktable 1TT at the same time as said movement of conveyor CV.

Front contact a of relay 1LS3P indicates turntable 1TT is in its raised position for the initiation of a 72° rotation of such turntable. Back contact b of relay 1LS3P, in conjunction with front contact b of relay 1LS4P, indicates the lowered psition of turntable 1TT and prepares the previously mentioned energizing circuit for winding W4 for raising of piston rod 1PCR of cylinder 1PC as well as a circuit for the energizing of windings W1 and W6 in preparation for a work operation to be performed at work station I. Back contact c of relay 1LS3P in conjunction with front contact c of relay 1LS4P indicates the lowered position of turntable 1TT for said previously mentioned workpiece transfers and for the energization of relay 1TFA upon actuation of the transfer arm 150 for such transfers. Front contact a of relay 1LS4P indicates the lowered position of turntable 1TT and prepares the energizing circuit for relay 1LS4S for any work operation to be performed at work station I, and front contact d of relay 1LS4P indicates the lowered position of turntable 1TT in preparation for a movement of conveyor CV as previously discussed.

Front contact b of relay 1LS5N indicates the normal position of transfer arm 150 in preparation for a rotation of turntable 1TT. Back contact b of relay 1TFA indicates that the immediately prior workpiece transfers have been completed and prepares the circuitry for another actuation of transfer arm 150. Front contact c of relay 1TFA completes the energizing circuit for winding W3 to thereby raise turntable 1TT and prepares the energizing circuit for energization of clutch brake CB and the initiation of a rotation of such turntable following the raising thereof, such circuit to clutch brake CB being completed over front contact *a* of relay 1LS3P. Front contact *d* of relay 1TFA, as previously mentioned, assures the completion of workpiece transfers at work station I before a movement of conveyor CV is initiated.

Front contact *c* of relay 1LS4S indicates that a workpiece holder is present at the work location at work station I for a work operation and, therefore, closes the energizing circuits for windings W6 and W1 to actuate clutch 160 to close about the lower stem portion of the workpiece holder 160 at said work location and to actuate work tool 180 downwardly for said work operation. Back contact *c* of relay 1LS4S closes, in conjunction with back contact *a* of relay 1LS1P, an energizing circuit for winding W2 for the raising of work tool 180 following said work operation. Back contact *d* of relay 1LS4S assures the released condition of such relay before turntable 1TT can be raised and before a rotation of such turntable can be initiated. Back contact *e* of relay 1LS4S assures the released condition of such relay before a movement of conveyor CV can be initiated as previously discussed and front contact *f* of relay 1LS4S assures that winding W4 is maintained energized and piston rod 1PCR is maintained raised for locking of turntable 1TT during work operations performed at work station I.

Back contact *b* of relay 1LS1P, in conjunction with front contact *a* of relay 1LS2P, completes the energizing circuit for work tool drive motor 1WTM and chuck clutch brake 1CCB following the lowering of work tool 180 to its work operation position. Back contact *c* of relay 1LS1P also assures the energization of winding W4 and, thereby, the locking of turntable 1TT until work tool 180 is raised to its full upward position following a work operation. Front contact *d* of relay 1LS1P, in conjunction with back contact *b* of relay 1LS2P assure that work tool 180 is in its raised position before winding W3 can be energized for the raising of worktable 1TT for a rotation thereof.

It is believed expedient to briefly summarize, at this point in the description and in broad general terms, several salient points in the control of and operation of the apparatus of the invention when such apparatus at all work stations I through V is operated or controlled by the type of control system including components, circuitry etc. such as those discussed above in conjunction with the apparatus located at or associated with work station I. Such salient points are as follows:

1. The apparatus at work station Ii and the control circuitry and components for or associated with such work station are identical to those and operate the same as described above in conjunction with work station I.

2. The apparatus at and the control system components for or associated with stations III, IV and V are also identical to those at work station I but, since the work operations at each such stations III through V require triple the time of those at work stations I and II, the control circuitry for the control system components for stations III, IV and V differs slightly from that for stations I and II as discussed in detail below. Furthermore, the time delay relays -TD for stations III, IV and V have or are set for approximately triple the time delay as that of or for which previously discussed time delay 1TD (FIG. 18) is set, for the purpose which is believed readily apparent.

3. Before any movement of conveyor CV is made, as previously discussed, the lowered position of all the turntables is checked and the completion of the workpiece transfers and work operations, if any, at work stations I and II is checked. At the times (every third movement of conveyor CV) that work-piece transfers are also to be made at work stations III, IV and V, the completion of the workpiece transfers and the workpiece operations, if any, at such stations are also checked prior to the movement of conveyor CV.

4. The rotations of the turntables or workpiece holder support means at work stations I through V are initiated just subsequent to the initiation of the movements of conveyor CV and, therefore, said rotations occur at substantially the same time as the movements of said conveyor, that is, said movements of said conveyor and the rotations of said turntables or workpiece holder support means at said work stations occur in selected time relationships with each other. Similarly, the respective workpiece transfer means at each said work station are actuated in selected time relationships with the rotations of the turntable or workpiece holder support means at the respectively associated work station.

Referring to FIG. 17, there is shown a so-called relay counting chain comprising relays FC1, BC1, FC2, BC2, FC3 and BC3, several of which were previously mentioned. Such relay counting chain is provided for the counting of three actuations of previously discussed relay TFPP to actuate workpiece holder transfers and turntable rotations at work stations III, IV and V only upon every third movement of conveyor CV. When relay 8PP became picked up at the startup of the apparatus as previously described, front contact *a* of such relay prepared the energizing circuit for relay TFPP, front contact *b* of relay 8PP closed the energizing circuits for relays 8P1 and 8P2 associated with work stations I and II, respectively, and front contact *c* of relay 8PP closed the energizing circuits for relays 8P3, 8P4 and 8P5 associated with work stations III, IV and V, respectively. Workpiece transfers were thus actuated at all the work stations and, following the actuation of the transfers at all the work stations (all -TFA relays energized) the checking of the lowered position of the turntables at all the work stations (all -LS4P relays energized) and the checking that work operations, if any, at only work stations I and II were completed (1LS4S and 2LS4S relays released) there was completed the previously described circuit over back contact *b* of above mentioned relay BC2 and extending over conductor C13 to front contact *d* of relay 5LS4P and thence over a circuit extending to previously mentioned front contact *a* of relay 8PP to the winding of relay TFPP. TFPP was thus picked up and front contact *a* of such relay initiated a movement of conveyor CV, as previously discussed, while front contact *b* of relay TFPP closed to complete the energizing circuit for relay FC1 of said relay counting chain. Relay FC1 thus picked up and closed its front contact *a* to prepare an energizing circuit for relay BC1 and, upon the subsequent release of relay TFPP by the release of relay 8PP, as also previously discussed, back contact *b* of relay TFPP closed to complete the energizing circuit for relay BC1 which then picked up to close its holding circuit over its own front contact *a* and back contact *b* of relay BC3. Relay FC1 is sufficiently slow release that its front contact *a* remained closed a sufficient length of time, following the opening of front contact *b* of relay TFPP, such that relay BC1 was picked up and closed its holding circuit prior to the opening of front contact *a* of relay FC1 in the energizing circuit for relay BC1. A first operation of the transfer apparatus at all the work stations was thereby counted and recorded by the energization of relay BC1 and its maintain energization at such time. It is pointed out that the continued energization of relays 8P3, 8P4 and 8P5 over back contact *b* of relay FC3 prevents the raising and rotations of the turntables at work stations III, IV and V, respectively, since the circuits, controlling such raising of the turntables and the initiation of the rotations thereof at such work stations, remain open at back contacts *c* of the respective relays 8P3, 8P4 and 8P5. (See, for example, back contact *c* of relay 8P1 for work station I shown in FIG. 18).

The above mentioned release of relay 8PP opened, at front contact *b* of such relay, the energizing circuits for relays 8P1 and 8P2 to release such relays and thereby raise the turntables at work stations I and II following the completion of work operations, if any, at such work tations. Following the raising of such turntables, relays 1LS3P and 2LS3P were energized, and rotations at work stations I and II were initiated. The completion of the movement of conveyor CV, and of the rotations of turntables TT1 and TT2, reenergizes relay 8PP, and relays 1P and 2P for work stations I and II. The pickup circuit for relay TFPP is again prepared over front contact *a* of relay 8PP, and the pickup circuits for relays 8P1 and 8P2 are again closed over front contact *b* of relay 8PP. Relays 8P1 and 8P2 are again energized to lower the turntables at stations I and II and prepare the workpiece transfer circuits at such work stations. Following the lowering of said turntables the workpiece transfer circuits at work stations I and II are completed and workpiece transfers at such stations are effected.

Following the above workpiece transfers and completion of work operations, if any, at work stations I and II, the energization circuit for relay TFPP is again completed and such relay is again energized for the initiation of another movement of conveyor CV. Limit switch LS8 is subsequently actuated as previously discussed, relay 8PP is again released, relay TFPP subsequently releases, and relays 8P1 and 8P2 are released for raising the turntables at work stations I and II and initiating rotations of such turntables. The picking up of relay TFPP for the second time, as discussed above, energizes relay FC2 of the relay counting chain over front contact *b* of relay BC1 and, the release of relay TFPP for the second time, closes an energizing circuit for relay BC2 over front contact *a* of relay FC2, and relay BC2 picks up and closes its holding circuit over its front contact *a*, and opens, at back contact *b*, the previously described alternate energizing circuit for relay TFPP. Similar operations subsequently take place for the third time with relay TFPP, for the energization thereof, now also checking relays 3LS4S, 4LS4S and 5LS4S in their deenergized condition, thereby indicating work operations, if any, at work stations III, IV and V completed. Relay FC3 is energized over front contact *b* of relay TFPP and front contact *b* of relay BC2. The release of relay TFPP for the third time, energizes relay BC3 over front contact *a* of relay FC3 and the holding circuits for relays BC1 and BC2 are opened by the opening of back contact *a* of relay BC3. Relays FC1, FC2 and FC3 subsequently release and open the pickup circuits for relays BC1, BC2 and BC3, respectively. Relays BC1 and BC2 are then released while relay BC3 remains picked up for its slow release period. Relay BC3 subsequently releases and the relay counting chain is back in its initial or normal condition. The above described energization of relay FC3 opened, at back contact *b* of such relay, the previously mentioned alternate energizing circuit extending between such contact *b* and over conductor C12 to the control windings of relays 8P3, 8P4 and 8P5 which then released since their energizing circuit over front contact *c* of relay 8PP is also open at such time. The slow pickup feature of relay 8PP assures time for the release of relays 8P3, 8P4 and 8P5, and the consequential raising and initiation of the rotations of the turntables at work stations III, IV and V before relay 8PP again picks up to energize relays 8P1 through 8P5. It is pointed out that, as long as the -LS7 limit switches at each respective work station have their contacts *a- c* closed (indicating rotation of respective turntables in progress) the opening of the back contacts *c* of the respective relays 8P1 through 8P5 is immaterial since said contacts *a-c* maintain closed alternate energizing circuits for clutch brakes -TCB and the windings such as W3 (FIG. 20) at the respective work stations I through V. The completion of the rotations of the turntables is thereby assured. Following the completion of the movement of conveyor CV, the completion of the rotations of the turntables at the respective work stations and the subsequent lowering of the turntables at the respective work stations, a workpiece transfer at each respective work station is effected. Upon the completion of all such transfers and the completion of work operations at work stations I and II, relay TFPP picks up for the fourth time and the series or sequence of operations at the several work stations is repeated similarly to that described when relay TFPP picked up for the first time. Such series or sequences of three operations (three actuations of relay TFPP) are thereafter repeated until the apparatus is shut down or until manual operations such as discussed below are made.

From time to time, it may be desired or necessary to shut down or disable the apparatus at any one or two of the work stations III, IV and V for maintenance or repair purposes, for example. For such purposes, therefore, there is provided the manually actuable push button switches 3DPB, 4DPB and 5DPB (FIG. 19) and respectively associated relays 3D, 4D and 5D which are associated with work stations III, IV and V, respectively. Since the circuits or disabling system controlled by each of said switches is similar to those controlled by each of the other of such switches, only a description of the circuits or disabling system associated with station III will be set forth in detail. It is sufficient to point out, in general, that the manual pushing or depressing of push button switches 3DPB, 4DPB and 5DPB and resultant closing of contacts *a* thereof energizes each respectively associated relay 3D, 4D and 5D, the circuit for such energization of each respective -D relay comprising a circuit extending directly from the previously mentioned power source PS and over contact *a* of the respectively associated push button switch -DPB and thence to and through the control winding of the respective relay -D.

Assuming then that 3DPB switch is manually actuated, relay 3D becomes energized and opens its back contact *a* which interrupts current from previously mentioned terminal B to a terminal B3 from which relay 3P is energized over contacts *b–c* of limit switch 3LS7. Relay 3P is, therefore, released when switch 3DPB is manually pushed or depressed and is left in its depressed or actuated condition. When relay 3D is energized as mentioned, front contact *c* of such relay closes and provides a by-pass circuit for front contacts *d* of relays 3TFA and 3LS4P in the previously traced energizing circuit for relay TFPP. Relay TFPP can, therefore, be energized regardless of the position of said contacts *d* of relays 3TFA and 3LS4P. The apparatus at the other work stations will continue to operate as if station III did not exist.

It is expedient to point out at this time that all of the relays and other components associated with work stations III, IV and V, and corresponding to the similar relays and other components shown in FIGS. 18 and 20 associated with work station I, are energized from respectively associated power terminals B3, B4 and B5 rather than directly from power terminal B as are the control relays and other components associated with work stations I and II. Therefore, when a push button 3DPB, 4DPB or 5DPB is depressed all of the relays associated with the respective work station III, IV or V are released. Thus, there is no need for supplying a bypass circuit for back contact *e* of relay 3LS4S (FIG. 19) when push button 3DPB is actuated. This also applies to back contacts *e* of relays 4LS4S and 5LS4S when the respective push buttons 4DPB and/or 5DPB are actuated as will be readily apparent.

When a work station such as III, IV or V is shut down or disabled in the manner discussed above in conjunction with work station III, it is expedient (although not necessary) that workpiece holders which would otherwise be manually loaded on conveyor CV at the manual load station (FIG. 1a) and otherwise destined to be delivered to the apparatus at the disabled work station for work operations, are not loaded on the conveyor. To this end, an indication light or lamp is provided at the manual loading station (FIG. 1a) and, when such light or lamp is energized and illuminated, a so-called do-not-load indication is given to the worker or loader at the loading station. The control of the energization of such lamp or light will be discussed in conjunction with FIGS. 1a, 1b, 1c, 17 and 19 of the drawings. Referring first to FIGS. 1a, 1b and 1c there is shown in such figures a plurality of work-piece holders or carriers carried by conveyor CV. Such workpiece holders are indicated by numerals 1, 2 or 3 which do not designate each respective workpiece holder itself but, rather, designate the respective work stations III, IV or V for which the respective workpiece holder is destined for work operations to be performed. That is to say, each workpiece holder indicated by the numeral 1 is destined for work station III and will be transferred to turntable 3TT at such work station for work operations to be perfrmed on the workpieces held or carried by such holder. Each workpiece holder indicated by the numerals 2 and 3 are destined for work stations IV and V, respectively, for work operations to be prformed on the workpieces carried by the workpiece holders indicated by the numerals 2 and 3, respectively. This will be readily apparent to those skilled in the art by a brief review of FIGS. 1a, 1b and 1c of the drawings.

Referring now to FIGS. 17 and 18 taken in conjunction with FIG. 1a, prior to the previously described start-up of the apparatus, a first workpiece holder (1) is supplied to or inserted in the recess 13 of the support plate such as 12 then positioned by conveyor CV at the manual loading station. If, however, the apparatus at work station III (FIG. 1b) is disabled or out of service at such time, the light or lamp DNL (FIG. 17) at the manual loading station will be energized or illuminated to give a do-not-load indication to the worker or loader at the loading station who is performing the conveyor loading. The circuit for energizing lamp DNL at such time extends directly from terminal PS of the previously mentioned power source, back contact *c* of previously discussed relay BC1, back contact *e* of previously discussed relay BC2, conductor C15, front contact *b* of previously discussed relay 3D which reflects that work station III has been disabled and, thence extends over conductor C14 and through the filament of lamp DNL to terminal N of the power source.

Lamp DNL is similarly energized when work stations IV and/or V are disabled or taken out of service. The circuit for energizing lamp DNL when station IV is disabled extends from said power terminal PS over front contact *c* of relay BC1, back contact *d* of relay BC2, conductor C16, front contact *b* of relay 4D and thence to conductor C14 and to lamp DNL as traced above. The circuit for energizing lamp DNL when work station V is disabled extends from power terminal PS over front contact *c* of relay BC1, front contact *d* of relay BC2, conductor C17, front contact *b* of relay 5D and thence to conductor C14 to lamp DNL as discussed above. It will be seen that the completion of each described circuit for the energization of lamp DNL dpends on the number of movements of conveyor CV as reflected by the energized or deenergized condition of relays BC1 and BC2 of the previously described relay counting chain, taken in conjunction with the energized condition of disabling relays 3D, 4D and 5D which reflect which of the work stations are disabled.

Although there is herein shown and described in detail only one form of apparatus embodying the invention, it will be understood that various changes and modifications can be made therein within the scope of the appended claims without departing from the spirit and scope of the invention.

What is claimed is:

1. In combination with a plurality of workpiece holders each supporting on an upper surface thereof at least one workpiece for work operations to be performed thereon and each such holder including a downwardly extending stem portion for handling of the respective holder, an apparatus for handling and transferring said holders between a plurality of spaced-apart work stations including, in sequence, a manual loading station, a first succession of work stations, a second succession of work stations, and a manual unloading station, such apparatus comprising;

A. a conveyor including an endless loop of equally spaced conveyor plates each embodying adjacent the outer edge thereof a recess adapted for receiving said downwardly extending stem portion of one of said workpiece holders, such conveyor adapted for intermittent movement through a looped path of travel extending past said work stations, and a succession of said holders being manually delivered at said loading station to said conveyor by manual insertion of said stem portion of each succeeding holder of said succession of holders in the respective recess of every second conveyor plate successively moved to said loading station;

B. workpiece holder support means at each of said work stations, each such means adapted for intermittent rotation through a circular path of travel including a work location associated with the respective support means, and each such support means embodying adjacent the outer circumference of its respective circular path of rotation a plurality of equally spaced-apart recesses each adapted for receiving the downwardly extending stem portion of one of said workpiece holders from the recess in one of said conveyor plates;

C. means for intermittently rotating each said workpiece holder support means through its respective said circular path of travel and to and from said work location associated with each respective workpiece holder support means;

D. means intermittently moving said conveyor through its said looped path of travel in time relationships with the intermittent rotation of said workpiece holder support means at said work stations, the intermittent rotation of the workpiece holder support means at each station of said first succession of work stations occurring a plurality of times for each intermittent rotation of the workpiece holder support means at each station of said second succession of work stations;

E. a workpiece holder transfer means associated with each of said work stations for intermittently transferring said workpiece holders between said conveyor and said workpiece holder support means at the respectively associated work station; and F. motor means associated with each said transfer means for intermittently actuating the respective transfer means in time relationships with the intermittent rotation of the workpiece holder support means at the respectively associated work station, each actuation of a transfer means occurring subsequent to each intermittent rotation of the respectively associated workpiece holder support means, and each such actuation operating to transfer said workpiece holders by the respec-tive transfer means pushing said downwardly extending stem portion of one of such holders out of the recess embodied in one of said conveyor plates and into one of said recesses embodied in the respectively associated workpiece holder support means while simultaneously pushing the downwardly extending portion of a preceding one of the workpiece holders out of a recess embodied in the associated support means and into the recess embodied in one of said conveyor plates.

2. Apparatus in accordance with claim 1 and further including at said work location in said circular path of travel of each respective said support means, a rotatable chuck for engaging said downwardly extending stem portion of each workpiece holder delivered to and dwelling at the respective work location during said intermittent rotation of the respective support means located at the respectively associated work station.

3. Apparatus in accordance with claim 2 and further including motor means associated with each said chuck for selectively imparting rotation to the respective chuck and thereby to each of said workpiece holders whose downwardly extending stem portion is engaged by the respective chuck while such workpiece holder is dwelling at the respective work location.

4. Apparatus in accordance with claim 1 and in which, said workpieces supported by said workpiece holders are lens blanks which are to be ground and polished to produce finished lens, said first succession of work stations comprise two successive lens grinding stations, said second succession of work stations comprise three successive lens polishing stations, and each of said plurality of times of occurrence of the intermittent rotation of the workpiece holder support means at each of said grinding stations is three times for each intermittent rotation of the workpiece holder support means at each of said polishing stations.

5. Apparatus in accordance with claim 2 and in which, said workpieces supported by said workpiece holders are lens blanks which are to be ground and polished to produce finished lens, said first succession of work stations comprise two successive lens grinding stations, said second succession of work stations comprise three successive lens polishing stations, and each of said plurality of times of occurrence of the intermittent rotation of the workpiece holder support means at each of said grinding stations is three times for each intermittent rotation of the workpiece holder support means at each of said polishing stations.

6. Apparatus in accordance with claim 3 and in which, said workpieces supported by said workpiece holders are lens blanks which are to be ground and polished to produce finished lens, said first succession of work stations comprise two successive lens grinding stations, said second succession of work stations comprise three successive lens polishing stations, and each of said plurality of times of occurrence of the intermittent rotation of the workpiece holder support means at each of said grinding stations is three times for each intermittent rotation of the workpiece holder support means at each of said polishing stations.

7. Apparatus in accordance with claim 4 and in which the durations of the grinding and polishing operations on the lens blanks at each said work station are automatically controlled in a time relationship with each intermittent rotation of the workpiece holder support means at the respective work station.

8. Apparatus in accordance with claim 5 and in which the durations of the grinding and polishing operations on the lens blanks at each said work station are automatically controlled in a time relationship with each intermittent rotation of the workpiece holder support means at the respective work station.

9. Apparatus in accordance with claim 6 and in which the durations of the grinding and polishing operations on the lens blanks at each said work station are automatically controlled in a time relationship with each intermittent rotation of the workpiece holder support means at the respective work station.

10. Apparatus in accordance with claim 1 and further including a separate manually actuable means associated with each said work station of said second succession of work stations, respectively, and control means, associated with each said manually actuable means and activated by the actuation of the respectively associated manually actuable means, to disable the apparatus at the respectively associated work station only.

11. Apparatus in accordance with claim 10 and further including means for giving an indication, at said manual loading station, of the disabled condition of the apparatus at a work station disabled by the actuation of the manually actuable means associated with the disabled work station.

12. Apparatus in accordance with claim 4 and further including a separate manually actuable means associated with each said work station of said second succession of work stations, respectively, and control means, associated with each said manually actuable means and activated by the actuation of the respectively associated manually actuable means, to disable the apparatus at the respectively associated work station only.

13. Apparatus in accordance with claim 12 and further including means for giving an indication, at said manual loading station, of the disabled condition of the apparatus at a work station disabled by the actuation of the manually actuable means associated with the disabled work station.

* * * * *